(12) United States Patent
Zhang et al.

(10) Patent No.: US 11,336,358 B2
(45) Date of Patent: May 17, 2022

(54) TRANSMISSION CONTROL METHOD

(71) Applicant: Huawei Technologies Co., Ltd., Shenzhen (CN)

(72) Inventors: Lili Zhang, Beijing (CN); Guorong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 16/648,129

(22) PCT Filed: Sep. 14, 2018

(86) PCT No.: PCT/CN2018/105614
§ 371 (c)(1),
(2) Date: Mar. 17, 2020

(87) PCT Pub. No.: WO2019/052518
PCT Pub. Date: Mar. 21, 2019

(65) Prior Publication Data
US 2020/0220606 A1    Jul. 9, 2020

(30) Foreign Application Priority Data

Sep. 18, 2017   (CN) .......................... 201710840597.4
Jan. 8, 2018    (CN) .......................... 201810016078.0
Mar. 5, 2018    (CN) .......................... 201810180592.8

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0626* (2013.01); *H04L 5/0051* (2013.01);
(Continued)

(58) Field of Classification Search
CPC ... H04B 7/0695; H04B 7/0626; H04L 5/0051; H04W 24/10; H04W 72/0413; H04W 72/046
See application file for complete search history.

(56) References Cited

U.S. PATENT DOCUMENTS

2010/0098012 A1   4/2010   Bala et al.
2013/0235742 A1   9/2013   Josiam et al.
(Continued)

FOREIGN PATENT DOCUMENTS

CN        102026377 A       4/2011
CN        102187726 A       9/2011
(Continued)

OTHER PUBLICATIONS

3GPP TS 38.212, V0.1.0, "3rd Generation Partnership Project; Technical Specification Group Radio Access Network; NR; Multiplexing and channel coding (Release 15)," Aug. 2017, 22 pages.
(Continued)

*Primary Examiner* — Deepa Belur
(74) *Attorney, Agent, or Firm* — Conley Rose, P.C.

(57) ABSTRACT

A transmission control method includes sending, by a terminal, uplink control information (UCI) in a first format of the UCI to a radio access network device, where the UCI includes at least one of measurement result information of beam groups or information of the beam groups. The measurement result information of the beam groups includes a measurement result of a first beam group and an offset of a measurement result of a second beam group relative to the measurement result of the first beam group. The measurement result of the first beam group is a reference measurement result, and the information of the beam groups indicates a beam group corresponding to at least one of the
(Continued)

measurement result of the first beam group or the measurement result of the second beam group.

20 Claims, 4 Drawing Sheets

(51) Int. Cl.
    *H04W 24/10*         (2009.01)
    *H04W 72/04*         (2009.01)

(52) U.S. Cl.
    CPC ......... *H04W 24/10* (2013.01); *H04W 72/046* (2013.01); *H04W 72/0413* (2013.01)

(56) References Cited

U.S. PATENT DOCUMENTS

| | | | |
|---|---|---|---|
| 2014/0003240 A1* | 1/2014 | Chen | H04L 5/14 370/235 |
| 2017/0086195 A1 | 3/2017 | Yum et al. | |
| 2017/0245260 A1 | 8/2017 | Islam et al. | |
| 2017/0303263 A1* | 10/2017 | Islam | H04L 5/0053 |
| 2018/0199328 A1* | 7/2018 | Sang | H04W 36/06 |
| 2018/0279293 A1* | 9/2018 | Harrison | H04B 7/0639 |
| 2018/0343650 A1 | 11/2018 | Zhou | |
| 2019/0028162 A1 | 1/2019 | Lee et al. | |
| 2019/0029046 A1 | 1/2019 | Li et al. | |
| 2019/0159054 A1* | 5/2019 | Yiu | H04B 7/0408 |
| 2020/0169896 A1 | 5/2020 | Li et al. | |

FOREIGN PATENT DOCUMENTS

| | | |
|---|---|---|
| CN | 103427940 A | 12/2013 |
| CN | 105722229 A | 6/2016 |
| CN | 106851675 A | 6/2017 |
| CN | 106992847 A | 7/2017 |
| KR | 20130103449 A | 9/2013 |
| WO | 2018085601 A1 | 5/2018 |
| WO | 2018183991 A1 | 10/2018 |

OTHER PUBLICATIONS

3GPP TS 38.214 V1.0.0, "3rd Generation Partnership Project; Technical Specification Group Radio Access Network; NR; Physical layer procedures for data (Release 15)," Sep. 2017, 32 pages.
3GPP TS 38.331 V0.0.5, (Aug. 2017), "3rd Generation Partnership Project; Technical Specification Group Radio Access Network; NR ;Radio Resource Control (RRC); Protocol specification (Release 15)," Aug. 2017, 38 pages.
Catt et al., "WF on monitoring of the group-common PDCCH," R1-1709706, 3GPP TSG RAN WG1 Meeting #89, Hangzhou, P. R. China, May 15-19, 2017, 3 pages.
Qualcomm, "Beam management offline summary," R1-1711965, RAN1 #89—May 15-19, Hangzhou, China, 11 pages.
Lenovo, et al., "DL beam measurement and reporting," R1-1712671, 3GPP TSG RAN WG1 #90, Prague, P.R. Czech, Aug. 21-25, 2017, 5 pages.
Spreadtrum Communications, "On L1-RSRP report for beam management," R1-1713050, 3GPP TSG RAN WG1 Meeting #90, Prague, Czech Rep., Aug. 21-25, 2017, 6 pages.
Interdigital, Inc., "Remaining issues on beam management," R1-1720630, 3GPP TSG RAN WG1 Meeting #91, Reno, USA, Nov. 27-Dec. 1, 2017, 13 pages.
Nokia, et al., "3GPP TSG RAN WG1 NR Ad-Hoc Meeting," R1-1701091, Spokane, USA, Jan. 16-20, 2017, 3 pages.
Spredtrum Communications, "Differential RSRP report for beam management," 3GPP TSG RAN WG1 NR Ad-Hoc#2, R1-1710361, Qingdao, P.R. China, Jun. 27-30, 2017, 5 pages.
Intel Corporation, "Details for DL Beam Management," 3GPP TSG-RAN WG1 NR AdHoc #2, R1-1710526, Qingdao, China, Jun. 27-30, 2017, 13 pages.
Nokia, "On beam grouping and reporting," 3GPP TSG RAN WG1 Meeting NR#3, R1-1716499, Nagoya, Japan, Sep. 18-21, 2017, 6 pages.
Qualcomm "Beam management for NR," 3GPP TSG-RAN WG1 #90, R1-1716396, Nagoya, P.R. Japan, Sep. 18-21, 2017, 6 pages.
Zte et al., "Discussion on beam management",3GPP TSG RAN WG1 Meeting NR#3 R1-1715440, Nagoya, Japan, Sep. 18-21, 2017, 11 pages.
NTT Docomo, "Views on NR Beam Management," 3GPP TSG RAN WG1 Meeting NR#3, R1-1716082, Nagoya, Japan, Sep. 18-21, 2017, 8 pages.
MediaTek Inc., "Remaining Details on Beam Management," 3GPP TSG RAN WG1 Meeting NR Ad-Hoc #3, Nagoya, Japan, Sep. 18-21, 2017, R1-1716213, 7 pages.
Ericsson, "Performance of beam management without beam indication," 3GPP TSG-RAN WG1 NR Ad Hoc #3, R1-1716366, Nagoya, Japan, Sep. 18-21, 2017, 11 pages.

* cited by examiner

TRANSMISSION CONTROL METHOD

CROSS-REFERENCE TO RELATED APPLICATIONS

This application is a U.S. National Stage of International Patent Application No. PCT/CN2018/105614 filed Sep. 14, 2018, which claims priority to Chinese Patent Application No. 201710840597.4 filed on Sep. 18, 2017, Chinese Patent Application No. 201810016078.0 filed on Jan. 8, 2018 and Chinese Patent Application No. 201810180592.8 filed on Mar. 5, 2018, which are hereby incorporated by reference in their entireties.

TECHNICAL FIELD

The present invention relates to the field of communications technologies, and in particular, to an uplink data transmission method, a radio access network device, and a terminal.

BACKGROUND

In a millimeter-wave system, a major limitation is that a communications link between a millimeter-wave transmit node or a base station and a terminal is prone to be blocked by a moving object. A solution to this problem may be applying ultra-dense network deployment and beamforming (beamforming), to ensure communication quality of millimeter waves.

In a 5G field, beam grouping, beam reporting, beam measurement based on beam group indication, and beam-based transmission and transformation are studied. A beam group is defined as follows: For one or more transmission and reception points, a plurality of transmit beams and/or receive beams are grouped into a beam set, or a plurality of transmit beam pairs and/or receive beam pairs are grouped into a beam pair set; or for one terminal, a plurality of transmit beams and/or receive beams are grouped into a beam set, or a plurality of transmit beam pairs and/or receive beam pairs are grouped into a beam pair set.

So far, in a beam reporting field, a need of reporting filtered reference signal received powers (reference signal receiving power, RSRP) of a plurality of beams has been discussed. In one case, when L1 differential L1-RSRP reporting is performed for a plurality of beams, an RSRP used as a reference value needs to be used to implement L1-RSRP differential reporting. The RSRP used as a reference value may be predefined or configurable. In this case, uplink control information (UL control information, UCI) used for beam reporting needs to be redesigned. However, no effective method is available in the prior art to implement beam group-based uplink control information design or beam-based uplink control information design.

SUMMARY

Embodiments of the present invention provide a data transmission method, a radio access network device, and a terminal, to resolve a problem of grouped beam group-based uplink control information reporting and beam-based uplink control information reporting in a millimeter-wave system.

According to a first aspect, an embodiment of this application provides a data transmission method. The method specifically includes: sending, by a terminal, uplink control information UCI in a first format of the UCI to a radio access network device, where the UCI sent in the first format includes at least one of measurement result information of beam groups and information of the beam groups, where the beam groups include a first beam group and a second beam group, the measurement result information of the beam groups includes a measurement result of the first beam group and an offset of a measurement result of the second beam group relative to the measurement result of the first beam group, the measurement result of the first beam group is a reference measurement result, and the information of the beam groups is used to indicate a beam group corresponding to at least one of the measurement result of the first beam group and the measurement result of the second beam group, where the beam group is one or more beam groups.

When there are a plurality of second beam groups, beam groups corresponding to the measurement results of the second beam groups are a plurality of respectively corresponding beam groups. That is, the second beam groups include a third beam group and a fourth beam group. In this case, the measurement results of the second beam groups include a measurement result corresponding to the third beam group and a measurement result corresponding to the fourth beam group. It should be noted that the second beam groups include, but are not limited to, the third beam group and the fourth beam group, and may alternatively include N beam groups, where N is a positive integer. It should be noted that "a plurality" in this application means at least two.

In this solution, beam grouping helps reduce beam management costs. In addition, a problem of grouped beam group-based uplink control information reporting in a millimeter-wave system is resolved, and grouped beam group measurement and measurement result reporting by using uplink control information are implemented, thereby properly utilizing resources and reducing reporting overheads.

In an optional implementation, the first beam group includes a beam group corresponding to a maximum measurement value, or a beam group corresponding to a minimum measurement value, or a beam group corresponding to a middle measurement value, in the beam groups.

A beam group is in one-to-one correspondence with a measurement result of the beam group. To be specific, the first beam group has the measurement result of the first beam group, or the first beam group corresponds to the measurement result of the first beam group, or the measurement result of the first beam group belongs to the first beam group, or a beam group corresponding to the measurement result of the first beam group is the first beam group. The second beam group has the measurement result of the second beam group, or the second beam group corresponds to the measurement result of the second beam group, or the measurement result of the second beam group belongs to the second beam group, or a beam group corresponding to the measurement result of the second beam group is the second beam group.

In another optional implementation, the middle measurement value includes a calculated average value of measurement values of the beam groups, or an average value calculated based on the maximum measurement value and the minimum measurement value, or a value that is in the middle of measurement values of the beam groups. In still another optional implementation, the first beam group includes a beam group corresponding to a largest beam group number, or a beam group corresponding to a smallest beam group number, or a beam group corresponding to a middle beam group number, in the beam groups, where the beam group with the middle beam group number is a beam group corresponding to a beam group number that is in the middle of a plurality of beam group numbers.

In another optional implementation, the information of the beam groups includes a beam group identifier corresponding to at least one of the measurement result of the first beam group and the measurement result of the second beam group, where the beam group identifier is at least one of a beam group identifier of the first beam group to which the reference measurement result belongs and a beam group identifier of the second beam group to which the offset relative to the reference measurement result belongs.

In yet another optional implementation, when the identifier of the second beam group is explicitly indicated, the identifier of the second beam group is the identifier of the second beam group itself, or the identifier of the second beam group is an offset relative to the identifier of the first beam group.

In yet another optional implementation, when the identifier of the second beam group is implicitly indicated, the offsets of the measurement results of the second beam groups relative to the reference measurement result are sorted sequentially in ascending or descending order of beam group numbers; or the offsets of the measurement results of the second beam groups relative to the reference measurement result are sorted sequentially in odd-number or even-number ascending order of beam group numbers; or the offsets of the measurement results of the second beam groups relative to the reference measurement result are sorted sequentially in odd-number or even-number descending order of beam group numbers; or the offsets of the measurement results of the second beam groups relative to the reference measurement result are sorted in a preset sorting manner.

In yet another optional implementation, when the identifier of the second beam group is implicitly indicated, the reference measurement result corresponding to the first beam group is a measurement result corresponding to a beam group with a largest beam group number, and the offsets of the measurement results of the second beam groups relative to the reference measurement result are sorted sequentially in descending order of beam group numbers; or the reference measurement result corresponding to the first beam group is a beam group measurement result corresponding to a beam group with a smallest beam group number, and the offsets of the measurement results of the second beam groups relative to the reference measurement result are sorted sequentially in ascending order of beam group numbers; or measurement results, of the beam groups, that are greater than a preset threshold are sorted in a preset sorting manner.

In yet another optional implementation, at least one of the preset threshold and the preset sorting manner is sent from the radio access network device to the terminal by using at least one of radio resource control (radio resource control, RRC) signaling and media access control (media access control, MAC) signaling; or at least one of the preset threshold and the preset sorting manner is preconfigured at the terminal.

In yet another optional implementation, before the step of sending, by a terminal, uplink control information UCI in a first format of the UCI to a radio access network device, the method further includes: receiving, by the terminal, indication information from the radio access network device, where the indication information is used to instruct the terminal whether to use the first beam group as a reference for UCI reporting or use the measurement result of the first beam group as a reference for UCI reporting.

In yet another optional implementation, when the indication information is used to instruct the terminal to use the first beam group as a reference, the indication information may further include a method for determining the first beam group; or when the indication information is used to instruct the terminal to use the measurement result of the first beam group as a reference, the indication information may further include a method for determining the measurement result of the first beam group as the reference measurement result.

In yet another optional implementation, the indication information is further used to indicate whether the UCI includes identifiers of the beam groups or contains only identifiers of the beam groups.

In yet another optional implementation, the indication information is further used to indicate that identifiers of beam groups corresponding to measurement results of the beam groups are explicitly indicated or implicitly indicated.

In yet another optional implementation, the indication information is further used to indicate that the UCI sent by the terminal in the first format includes that the measurement result information of the beam groups is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beam groups, where the reference signal includes at least one of a synchronization signal, a synchronization signal resource identifier, a channel state information reference signal CSI-RS, and a CSI-RS resource identifier.

According to a second aspect, an embodiment of this application provides a data transmission method. The method specifically includes: sending, by a terminal, uplink control information UCI in a first format of the UCI to a radio access network device, where the UCI sent in the first format includes at least one of measurement result information of beams and information of the beams, where the beams include a first beam and a second beam, the measurement result information of the beams includes a measurement result of the first beam and an offset of a measurement result of the second beam relative to the measurement result of the first beam, the measurement result of the first beam is a reference measurement result, and the information of the beams is used to indicate a beam corresponding to at least one of the measurement result of the first beam and the measurement result of the second beam, where the beam is one or more beams. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the first beam includes a beam corresponding to a maximum measurement value, or a beam corresponding to a minimum measurement value, or a beam corresponding to a middle measurement value, in the beams. A beam is in one-to-one correspondence with a measurement result of the beam. To be specific, the first beam has the measurement result of the first beam, or the first beam corresponds to the measurement result of the first beam, or the measurement result of the first beam belongs to the first beam, or a beam corresponding to the measurement result of the first beam is the first beam. The second beam has the measurement result of the second beam, or the second beam corresponds to the measurement result of the second beam, or the measurement result of the second beam belongs to the second beam, or a beam corresponding to the measurement result of the second beam is the second beam.

In another optional implementation, the middle measurement value includes a calculated average value of measurement values of the beams, or an average value calculated based on the maximum measurement value and the minimum measurement value, or a value that is in the middle of measurement values of the beams.

In still another optional implementation, the first beam includes a beam corresponding to a largest beam number, or a beam corresponding to a smallest beam number, or a beam corresponding to a middle beam number, in the beams, where the beam with the middle beam number is a beam corresponding to a beam number that is in the middle of a plurality of beam numbers.

In yet another optional implementation, the information of the beams includes a beam identifier corresponding to at least one of the measurement result of the first beam and the measurement result of the second beam, where the beam identifier is at least one of a beam identifier of the first beam to which the reference measurement result belongs and a beam identifier of the second beam to which the offset relative to the reference measurement result belongs.

In yet another optional implementation, the information of the beams includes: when the identifier of the second beam is explicitly indicated, the identifier of the second beam is the identifier of the second beam itself, or the identifier of the second beam is an offset relative to the identifier of the first beam.

In yet another optional implementation, when the identifier of the second beam is implicitly indicated, the offsets of the measurement results of the second beams relative to the reference measurement result are sorted sequentially in ascending or descending order of beam numbers; or the offsets of the measurement results of the second beams relative to the reference measurement result are sorted sequentially in odd-number or even-number ascending order of beam numbers; or the offsets of the measurement results of the second beams relative to the reference measurement result are sorted sequentially in odd-number or even-number descending order of beam numbers; or the offsets of the measurement results of the second beams relative to the reference measurement result are sorted in a preset sorting manner.

In yet another optional implementation, when the identifier of the second beam is implicitly indicated, the reference measurement result corresponding to the first beam is a beam measurement result corresponding to a beam with a largest beam number, and the offsets of the measurement results of the second beams relative to the reference measurement result are sorted sequentially in descending order of beam numbers; or the reference measurement result corresponding to the first beam is a beam measurement result corresponding to a beam with a smallest beam number, and the offsets of the measurement results of the second beams relative to the reference measurement result are sorted sequentially in ascending order of beam numbers; or measurement results, of the beams, that are greater than a preset threshold are sorted in a preset sorting manner.

In yet another optional implementation, at least one of the preset threshold and the preset sorting manner is sent from the radio access network device to the terminal by using at least one of radio resource control RRC signaling and media access control signaling; or at least one of the preset threshold and the preset sorting manner is preconfigured on the terminal.

In yet another optional implementation, before the step of sending, by a terminal, uplink control information UCI in a first format of the UCI to a radio access network device, the method further includes: receiving, by the terminal, indication information from the radio access network device, where the indication information is used to instruct the terminal whether to use the first beam as a reference for UCI reporting or use the measurement result of the first beam as a reference for UCI reporting.

In yet another optional implementation, when the indication information is used to instruct the terminal to use the first beam as a reference, the indication information may further include a method for determining the first beam; or when the indication information is used to instruct the terminal to use the measurement result of the first beam as a reference, the indication information may further include a method for determining the measurement result of the first beam as the reference measurement result.

In yet another optional implementation, the indication information is further used to indicate whether the UCI includes identifiers of the beams or contains only identifiers of the beams.

In yet another optional implementation, the indication information is further used to indicate that identifiers of beams corresponding to measurement results of the beams are explicitly indicated or implicitly indicated.

In yet another optional implementation, the indication information is further used to indicate that the UCI sent by the terminal in the first format includes that the measurement result information of the beams is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beams, where the reference signal includes at least one of a synchronization signal, a synchronization signal resource identifier, a channel state information reference signal CSI-RS, and a CSI-RS resource identifier.

According to a third aspect, an embodiment of this application provides a data transmission method. The method specifically includes: sending, by a radio access network device, indication information to a terminal, where the indication information is used to instruct the terminal whether to use a first beam group as a reference for uplink control information UCI reporting or use a measurement result of the first beam group as a reference for uplink control information UCI reporting; receiving, by the radio access network device, UCI sent by the terminal in a first format, where the UCI includes at least one of measurement result information of beam groups and information of the beam groups, where the beam groups include the first beam group and a second beam group, the measurement result information of the beam groups includes a measurement result of the first beam group and an offset of a measurement result of the second beam group relative to the measurement result of the first beam group, the measurement result of the first beam group is a reference measurement result, and the information of the beam groups is used to indicate a beam group corresponding to at least one of the measurement result of the first beam group and the measurement result of the second beam group, where the beam group is one or more beam groups. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

In this solution, beam grouping helps reduce beam management costs. In addition, a problem of grouped beam group-based uplink control information reporting in a millimeter-wave system is resolved, and grouped beam group measurement and measurement result reporting by using uplink control information are implemented, thereby properly utilizing resources and reducing reporting overheads.

In an optional implementation, the indication information is further used to instruct the terminal whether to use the first beam group as a reference for UCI reporting or use the measurement result of the first beam group as a reference for UCI reporting.

In another optional implementation, the indication information is further used to instruct the terminal to determine the first beam group from a plurality of beam groups, and use the first beam group as a reference for UCI reporting or use the measurement result of the first beam group as a reference for UCI reporting.

In still another optional implementation, the indication information is further used to instruct the terminal whether to determine the first beam group by using a method for determining the first beam group.

In yet another optional implementation, the indication information is further used to indicate whether the UCI includes identifiers of the beam groups or contains only identifiers of the beam groups.

In yet another optional implementation, the indication information is further used to indicate that identifiers of beam groups corresponding to measurement results of the beam groups are explicitly indicated or implicitly indicated.

In yet another optional implementation, the indication information is further used to indicate that the UCI sent by the terminal in the first format includes that the measurement result information of the beam groups is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beam groups, where the reference signal includes at least one of a synchronization signal, a synchronization signal resource identifier, a channel state information reference signal CSI-RS, and a CSI-RS resource identifier.

In yet another optional implementation, the indication information is indicated by using at least one of radio resource control signaling, media access control signaling, and physical layer signaling.

According to a fourth aspect, an embodiment of this application provides a data transmission method. The method specifically includes: sending, by a radio access network device, indication information to a terminal, where the indication information is used to instruct the terminal whether to use a first beam as a reference for uplink control information UCI reporting or use a measurement result of the first beam as a reference for uplink control information UCI reporting; receiving, by the radio access network device, UCI sent by the terminal in a first format, where the UCI includes at least one of measurement result information of beams and information of the beams, where the beams include the first beam and a second beam, the measurement result information of the beams includes a measurement result of the first beam and an offset of a measurement result of the second beam relative to the measurement result of the first beam, the measurement result of the first beam is a reference measurement result, and the information of the beams is used to indicate a beam corresponding to at least one of the measurement result of the first beam and the measurement result of the second beam, where the beam is one or more beams. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the indication information is further used to instruct the terminal whether to use the first beam as a reference for UCI reporting or use the measurement result of the first beam as a reference for UCI reporting.

In another optional implementation, the indication information is further used to instruct the terminal to determine the first beam from a plurality of beams, and use the first beam as a reference for UCI reporting or use the measurement result of the first beam as a reference for UCI reporting.

In still another optional implementation, the indication information is further used to instruct the terminal whether to determine the first beam group by using a method for determining the first beam group.

In yet another optional implementation, the indication information is further used to indicate whether the UCI includes identifiers of the beams or contains only identifiers of the beams.

In yet another optional implementation, the indication information is further used to indicate that identifiers of beams corresponding to measurement results of the beams are explicitly indicated or implicitly indicated.

In yet another optional implementation, the indication information is further used to indicate that the UCI sent by the terminal in the first format includes that the measurement result information of the beams is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beams, where the reference signal includes at least one of a synchronization signal, a synchronization signal resource identifier, a channel state information reference signal CSI-RS, and a CSI-RS resource identifier.

In yet another optional implementation, the indication information is indicated by using at least one of radio resource control signaling, media access control signaling, and physical layer signaling.

According to a fifth aspect, an embodiment of this application provides a terminal. The terminal may specifically include a transceiver, configured to send uplink control information UCI in a first format of the UCI to a radio access network device, where the UCI sent in the first format includes at least one of measurement result information of beam groups and information of the beam groups, where the beam groups include a first beam group and a second beam group, the measurement result information of the beam groups includes a measurement result of the first beam group and an offset of a measurement result of the second beam group relative to the measurement result of the first beam group, the measurement result of the first beam group is a reference measurement result, and the information of the beam groups is used to indicate a beam group corresponding to at least one of the measurement result of the first beam group and the measurement result of the second beam group, where the beam group is one or more beam groups. When there are a plurality of second beam groups, beam groups corresponding to the measurement results of the second beam groups are a plurality of respectively corresponding beam groups. That is, the second beam groups include a third beam group and a fourth beam group. In this case, the measurement results of the second beam groups include a measurement result corresponding to the third beam group and a measurement result corresponding to the fourth beam group. It should be noted that the second beam groups include, but are not limited to, the third beam group and the fourth beam group, and may alternatively include N beam groups, where N is a positive integer.

In this solution, beam grouping helps reduce beam management costs. In addition, a problem of grouped beam group-based uplink control information reporting in a millimeter-wave system is resolved, and grouped beam group measurement and measurement result reporting by using uplink control information are implemented, thereby properly utilizing resources and reducing reporting overheads.

In an optional implementation, the first beam group includes a beam group corresponding to a maximum measurement value, or a beam group corresponding to a minimum measurement value, or a beam group corresponding to a middle measurement value, in the beam groups. A beam group is in one-to-one correspondence with a measurement result of the beam group. To be specific, the first beam group has the measurement result of the first beam group, or the first beam group corresponds to the measurement result of the first beam group, or the measurement result of the first beam group belongs to the first beam group, or a beam group corresponding to the measurement result of the first beam group is the first beam group. The second beam group has the measurement result of the second beam group, or the second beam group corresponds to the measurement result of the second beam group, or the measurement result of the second beam group belongs to the second beam group, or a beam group corresponding to the measurement result of the second beam group is the second beam group.

In another optional implementation, the middle measurement value includes a calculated average value of measurement values of the beam groups, or an average value calculated based on the maximum measurement value and the minimum measurement value, or a value that is in the middle of measurement values of the beam groups. In still another optional implementation, the first beam group includes a beam group corresponding to a largest beam group number, or a beam group corresponding to a smallest beam group number, or a beam group corresponding to a middle beam group number, in the beam groups, where the beam group with the middle beam group number is a beam group corresponding to a beam group number that is in the middle of a plurality of beam group numbers.

In yet another optional implementation, the information of the beam groups includes a beam group identifier corresponding to at least one of the measurement result of the first beam group and the measurement result of the second beam group, where the beam group identifier is at least one of a beam group identifier of the first beam group to which the reference measurement result belongs and a beam group identifier of the second beam group to which the offset relative to the reference measurement result belongs.

In yet another optional implementation, the processor is further configured to determine that when the identifier of the second beam group is explicitly indicated, the identifier of the second beam group is the identifier of the second beam group itself, or the identifier of the second beam group is an offset relative to the identifier of the first beam group.

In yet another optional implementation, the processor is further configured to determine that when the identifier of the second beam group is implicitly indicated, the offsets of the measurement results of the second beam groups relative to the reference measurement result are sorted sequentially in ascending or descending order of beam group numbers; or the offsets of the measurement results of the second beam groups relative to the reference measurement result are sorted sequentially in odd-number or even-number ascending order of beam group numbers; or the offsets of the measurement results of the second beam groups relative to the reference measurement result are sorted sequentially in odd-number or even-number descending order of beam group numbers; or the offsets of the measurement results of the second beam groups relative to the reference measurement result are sorted in a preset sorting manner.

In yet another optional implementation, the processor is further configured to determine that when the identifier of the second beam group is implicitly indicated, the reference measurement result corresponding to the first beam group is a beam group measurement result corresponding to a beam group with a largest beam group, and the offsets of the measurement results of the second beam groups relative to the reference measurement result are sorted sequentially in descending order of beam group numbers; or the reference measurement result corresponding to the first beam group is a beam group measurement result corresponding to a beam group with a smallest beam group number, and the offsets of the measurement results of the second beam groups relative to the reference measurement result are sorted sequentially in ascending order of beam group numbers; or measurement results, of the beam groups, that are greater than a preset threshold are sorted in a preset sorting manner.

In yet another optional implementation, at least one of the preset threshold and the preset sorting manner is sent from the radio access network device to the terminal by using at least one of radio resource control RRC signaling and media access control signaling; or at least one of the preset threshold and the preset sorting manner is preconfigured on the terminal.

In yet another optional implementation, the transceiver is further configured to receive indication information from the radio access network device, where the indication information is used to instruct the processor whether to use the first beam group as a reference for UCI reporting or use the measurement result of the first beam group as a reference for UCI reporting.

In yet another optional implementation, when the indication information is used to instruct the processor to use the first beam group as a reference, the indication information may further include a method for determining the first beam group; or when the indication information is used to instruct the processor to use the measurement result of the first beam group as a reference, the indication information may further include a method for determining the measurement result of the first beam group as the reference measurement result.

In yet another optional implementation, the indication information is further used to indicate whether the UCI includes identifiers of the beam groups or contains only identifiers of the beam groups.

In yet another optional implementation, the indication information is further used to indicate that identifiers of beam groups corresponding to measurement results of the beam groups are explicitly indicated or implicitly indicated.

In yet another optional implementation, the indication information is further used to indicate that the UCI sent by the transceiver in the first format includes that the measurement result information of the beam groups is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beam groups, where the reference signal includes at least one of a synchronization signal, a synchronization signal resource identifier, a channel state information reference signal CSI-RS, and a CSI-RS resource identifier.

According to a sixth aspect, an embodiment of this application provides a terminal. The terminal may specifically include a transceiver, configured to send uplink control information UCI in a first format of the UCI to a radio access network device, where the UCI sent in the first format includes at least one of measurement result information of beams and information of the beams, where the beams include a first beam and a second beam, the measurement result information of the beams includes a measurement result of the first beam and an offset of a measurement result of the second beam relative to the measurement result of the first beam, the measurement result of the first beam is a reference measurement result, and the information of the beams is used to indicate a beam corresponding to at least one of the measurement result of the first beam and the measurement result of the second beam, where the beam is one or more beams. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the first beam includes a beam corresponding to a maximum measurement value, or a beam corresponding to a minimum measurement value, or a beam corresponding to a middle measurement value, in the beams. A beam is in one-to-one correspondence with a measurement result of the beam. To be specific, the first beam has the measurement result of the first beam, or the first beam corresponds to the measurement result of the first beam, or the measurement result of the first beam belongs to the first beam, or a beam corresponding to the measurement result of the first beam is the first beam. The second beam has the measurement result of the second beam, or the second beam corresponds to the measurement result of the second beam, or the measurement result of the second beam belongs to the second beam, or a beam corresponding to the measurement result of the second beam is the second beam.

In another optional implementation, the middle measurement value includes a calculated average value of measurement values of the beams, or an average value calculated based on the maximum measurement value and the minimum measurement value, or a value that is in the middle of measurement values of the beams. In still another optional implementation, the processor is further configured to: the first beam includes a beam corresponding to a largest beam number, or a beam corresponding to a smallest beam number, or a beam corresponding to a middle beam number, in the beams, where the beam with the middle beam number is a beam corresponding to a beam number that is in the middle of a plurality of beam numbers.

In yet another optional implementation, the information of the beams includes a beam identifier corresponding to at least one of the measurement result of the first beam and the measurement result of the second beam, where the beam identifier is at least one of a beam identifier of the first beam to which the reference measurement result belongs and a beam identifier of the second beam to which the offset relative to the reference measurement result belongs.

In yet another optional implementation, the processor is further configured to determine that when the identifier of the second beam is explicitly indicated, the identifier of the second beam is the identifier of the second beam itself, or the identifier of the second beam is an offset relative to the identifier of the first beam.

In yet another optional implementation, the processor is further configured to determine that when the identifier of the second beam is implicitly indicated, the offsets of the measurement results of the second beams relative to the reference measurement result are sorted sequentially in ascending or descending order of beam numbers; or the offsets of the measurement results of the second beams relative to the reference measurement result are sorted sequentially in odd-number or even-number ascending order of beam numbers; or the offsets of the measurement results of the second beams relative to the reference measurement result are sorted sequentially in odd-number or even-number descending order of beam numbers; or the offsets of the measurement results of the second beams relative to the reference measurement result are sorted in a preset sorting manner.

In yet another optional implementation, the processor is further configured to determine that when the identifier of the second beam is implicitly indicated, the reference measurement result corresponding to the first beam is a beam measurement result corresponding to a beam with a largest beam number, and the offsets of the measurement results of the second beams relative to the reference measurement result are sorted sequentially in descending order of beam numbers; or the reference measurement result corresponding to the first beam is a beam measurement result corresponding to a beam with a smallest beam number, and the offsets of the measurement results of the second beams relative to the reference measurement result are sorted sequentially in ascending order of beam numbers; or measurement results, of the beams, that are greater than a preset threshold are sorted in a preset sorting manner.

In yet another optional implementation, at least one of the preset threshold and the preset sorting manner is sent from the radio access network device to the terminal by using at least one of radio resource control RRC signaling and media access control signaling; or at least one of the preset threshold and the preset sorting manner is preconfigured on the terminal.

In yet another optional implementation, the transceiver is further configured to receive indication information from the radio access network device, where the indication information is used to instruct the processor whether to use the first beam as a reference for UCI reporting or use the measurement result of the first beam as a reference for UCI reporting.

In yet another optional implementation, when the indication information is used to instruct the processor to use the first beam as a reference, the indication information may further include a method for determining the first beam; or when the indication information is used to instruct the processor to use the measurement result of the first beam as a reference, the indication information may further include a method for determining the measurement result of the first beam as the reference measurement result.

In yet another optional implementation, the indication information is further used to indicate whether the UCI includes identifiers of the beams or contains only identifiers of the beams.

In yet another optional implementation, the indication information is further used to indicate that identifiers of beams corresponding to measurement results of the beams are explicitly indicated or implicitly indicated.

In yet another optional implementation, the indication information is further used to indicate that the UCI sent by the transceiver in the first format includes that the measurement result information of the beams is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beams, where the reference signal includes at least one of a synchronization signal, a synchronization signal resource identifier, a channel state information reference signal CSI-RS, and a CSI-RS resource identifier.

According to a seventh aspect, an embodiment of this application provides a radio access network device. The radio access network device may specifically include a transceiver, configured to send indication information to a terminal, where the indication information is used to instruct the terminal whether to use a first beam group as a reference for uplink control information UCI reporting or use a measurement result of the first beam group as a reference for uplink control information UCI reporting; and the transceiver is further configured to receive UCI sent by the terminal in a first format, where the UCI includes at least one of measurement result information of beam groups and information of the beam groups, where the beam groups include the first beam group and a second beam group, the measurement result information of the beam groups includes a measurement result of the first beam group and an offset of a measurement result of the second beam group relative to the measurement result of the first beam group, the measurement result of the first beam group is a reference measurement result, and the information of the beam groups is used to indicate a beam group corresponding to at least one of the measurement result of the first beam group and the measurement result of the second beam group, where the beam group is one or more beam groups. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the indication information is further used to instruct the terminal whether to use the first beam group as a reference for UCI reporting or use the measurement result of the first beam group as a reference for UCI reporting.

In another optional implementation, the indication information is further used to instruct the terminal to determine the first beam group from a plurality of beam groups, and use the first beam group as a reference for UCI reporting or use the measurement result of the first beam group as a reference for UCI reporting.

In still another optional implementation, the indication information is further used to instruct the terminal whether to determine the first beam group by using a method for determining the first beam group.

In yet another optional implementation, the indication information is further used to indicate whether the UCI includes identifiers of the beam groups or contains only identifiers of the beam groups.

In yet another optional implementation, the indication information is further used to indicate that identifiers of beam groups corresponding to measurement results of the beam groups are explicitly indicated or implicitly indicated.

In yet another optional implementation, the indication information is further used to indicate that the UCI sent by the terminal in the first format includes that the measurement result information of the beam groups is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beam groups, where the reference signal includes at least one of a synchronization signal, a synchronization signal resource identifier, a channel state information reference signal CSI-RS, and a CSI-RS resource identifier.

In yet another optional implementation, the indication information is indicated by using at least one of radio resource control signaling, media access control signaling, and physical layer signaling.

According to an eighth aspect, an embodiment of this application provides a radio access network device. The radio access network device may specifically include a transceiver, configured to send indication information to a terminal, where the indication information is used to instruct the terminal whether to use a first beam as a reference for uplink control information UCI reporting or use a measurement result of the first beam as a reference for uplink control information UCI reporting; and the transceiver is further configured to receive UCI sent by the terminal in a first format, where the UCI includes at least one of measurement result information of beams and information of the beams, where the beams include the first beam and a second beam, the measurement result information of the beams includes a measurement result of the first beam and an offset of a measurement result of the second beam relative to the measurement result of the first beam, the measurement result of the first beam is a reference measurement result, and the information of the beams is used to indicate a beam corresponding to at least one of the measurement result of the first beam and the measurement result of the second beam, where the beam is one or more beams. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the indication information is further used to instruct the terminal whether to use the first beam as a reference for UCI reporting or use the measurement result of the first beam as a reference for UCI reporting.

In another optional implementation, the indication information is further used to instruct the terminal to determine the first beam from a plurality of beams, and use the first beam as a reference for UCI reporting or use the measurement result of the first beam as a reference for UCI reporting.

In still another optional implementation, the indication information is further used to instruct the terminal whether to determine the first beam group by using a method for determining the first beam group.

In yet another optional implementation, the indication information is further used to indicate Whether the UCI includes identifiers of the beams or contains only identifiers of the beams.

In yet another optional implementation, the indication information is further used to indicate that identifiers of beams corresponding to measurement results of the beams are explicitly indicated or implicitly indicated.

In yet another optional implementation, the indication information is further used to indicate that the UCI sent by the terminal in the first format includes that the measurement result information of the beams is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beams, where the reference signal includes at least one of a synchronization signal, a synchronization signal resource identifier, a channel state information reference signal CSI-RS, and a CSI-RS resource identifier.

According to a ninth aspect, an embodiment of this application provides a terminal. The terminal may specifically include a transceiver unit, configured to send uplink control information UCI in a first format of the UCI to a radio access network device, where the UCI sent in the first format includes at least one of measurement result information of beam groups and information of the beam groups, where the beam groups include a first beam group and a second beam group, the measurement result information of the beam groups includes a measurement result of the first beam group and an offset of a measurement result of the second beam group relative to the measurement result of the first beam group, the measurement result of the first beam group is a reference measurement result, and the information of the beam groups is used to indicate a beam group corresponding to at least one of the measurement result of the first beam group and the measurement result of the second beam group, where the beam group is one or more beam groups. When there are a plurality of second beam groups, beam groups corresponding to the measurement results of the second beam groups are a plurality of respectively corresponding beam groups. That is, the second beam groups include a third beam group and a fourth beam group. In this case, the measurement results of the second beam groups include a measurement result corresponding to the third beam group and a measurement result corresponding to the fourth beam group. It should be noted that the second beam groups include, but are not limited to, the third beam group and the fourth beam group, and may alternatively include N beam groups, where N is a positive integer.

In this solution, beam grouping helps reduce beam management costs. In addition, a problem of grouped beam group-based uplink control information reporting in a millimeter-wave system is resolved, and grouped beam group measurement and measurement result reporting by using uplink control information are implemented, thereby properly utilizing resources and reducing reporting overheads (overhead).

In an optional implementation, the terminal may further include: the first beam group includes a beam group corresponding to a maximum measurement value, or a beam group corresponding to a minimum measurement value, or a beam group corresponding to a middle measurement value, in the beam groups. A beam group is in one-to-one correspondence with a measurement result of the beam group. To be specific, the first beam group has the measurement result of the first beam group, or the first beam group corresponds to the measurement result of the first beam group, or the measurement result of the first beam group belongs to the first beam group, or a beam group corresponding to the measurement result of the first beam group is the first beam group. The second beam group has the measurement result of the second beam group, or the second beam group corresponds to the measurement result of the second beam group, or the measurement result of the second beam group belongs to the second beam group, or a beam group corresponding to the measurement result of the second beam group is the second beam group.

In another optional implementation, the middle measurement value includes a calculated average value of measurement values of the beam groups, or an average value calculated based on the maximum measurement value and the minimum measurement value, or a value that is in the middle of measurement values of the beam groups. In still another optional implementation, the first beam group includes a beam group corresponding to a largest beam group number, or a beam group corresponding to a smallest beam group number, or a beam group corresponding to a middle beam group number, in the beam groups, where the beam group with the middle beam group number is a beam group corresponding to a beam group number that is in the middle of a plurality of beam group numbers.

In yet another optional implementation, the information of the beam groups includes a beam group identifier corresponding to at least one of the measurement result of the first beam group and the measurement result of the second beam group, where the beam group identifier is at least one of a beam group identifier of the first beam group to which the reference measurement result belongs and a beam group identifier of the second beam group to which the offset relative to the reference measurement result belongs.

In yet another optional implementation, the processing unit is further configured to determine that when the identifier of the second beam group is explicitly indicated, the identifier of the second beam group is the identifier of the second beam group itself, or the identifier of the second beam group is an offset relative to the identifier of the first beam group.

In yet another optional implementation, the processing unit is further configured to determine that when the identifier of the second beam group is implicitly indicated, the offsets of the measurement results of the second beam groups relative to the reference measurement result are sorted sequentially in ascending or descending order of beam group numbers; or the offsets of the measurement results of the second beam groups relative to the reference measurement result are sorted sequentially in odd-number or even-number ascending order of beam group numbers; or the offsets of the measurement results of the second beam groups relative to the reference measurement result are sorted sequentially in odd-number or even-number descending order of beam group numbers; or the offsets of the measurement results of the second beam groups relative to the reference measurement result are sorted in a preset sorting manner.

In yet another optional implementation, the processing unit is further configured to determine that when the identifier of the second beam group is implicitly indicated, the reference measurement result corresponding to the first beam group is a beam group measurement result corresponding to a beam group with a largest beam group number, and the offsets of the measurement results of the second beam groups relative to the reference measurement result are sorted sequentially in descending order of beam group numbers; or the reference measurement result corresponding to the first beam group is a beam group measurement result corresponding to a beam group with a smallest beam group number, and the offsets of the measurement results of the second beam groups relative to the reference measurement result are sorted sequentially in ascending order of beam group numbers; or measurement results, of the beam groups, that are greater than a preset threshold are sorted in a preset sorting manner.

In yet another optional implementation, at least one of the preset threshold and the preset sorting manner is sent from the radio access network device to the terminal by using at least one of radio resource control RRC signaling and media access control signaling; or at least one of the preset threshold and the preset sorting manner is preconfigured on the terminal.

In yet another optional implementation, the transceiver unit is further configured to receive indication information from the radio access network device, where the indication information is used to instruct the processing unit whether to use the first beam group as a reference for UCI reporting or use the measurement result of the first beam group as a reference for UCI reporting.

In yet another optional implementation, when the indication information is used to instruct the processing unit to use the first beam group as a reference, the indication information may further include a method for determining the first beam group; or when the indication information is used to instruct the processing unit to use the measurement result of the first beam group as a reference, the indication information may further include a method for determining the measurement result of the first beam group as the reference measurement result.

In yet another optional implementation, the indication information is further used to indicate whether the UCI includes identifiers of the beam groups or contains only identifiers of the beam groups.

In yet another optional implementation, the indication information is further used to indicate that identifiers of beam groups corresponding to measurement results of the beam groups are explicitly indicated or implicitly indicated.

In yet another optional implementation, the indication information is further used to indicate that the UCI sent by the transceiver unit in the first format includes that the measurement result information of the beam groups is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beam groups, where the reference signal includes at least one of a synchronization signal, a synchronization signal resource identifier, a channel state information reference signal CSI-RS, and a CSI-RS resource identifier.

According to a tenth aspect, an embodiment of this application provides a terminal. The terminal may specifically include a transceiver unit, configured to send uplink control information UCI in a first format of the UCI to a radio access network device, where the UCI sent in the first format includes at least one of measurement result information of beams and information of the beams, where the beams include a first beam and a second beam, the measurement result information of the beams includes a measurement result of the first beam and an offset of a measurement result of the second beam relative to the measurement result of the first beam, the measurement result of the first beam is a reference measurement result, and the information of the beams is used to indicate a beam corresponding to at least one of the measurement result of the first beam and the measurement result of the second beam, where the beam is one or more beams. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the first beam includes a beam corresponding to a maximum measurement value, or a beam corresponding to a minimum measurement value, or a beam corresponding to a middle measurement value, in the beams. A beam is in one-to-one correspondence with a measurement result of the beam. To be specific, the first beam has the measurement result of the first beam, or the first beam corresponds to the measurement result of the first beam, or the measurement result of the first beam belongs to the first beam, or a beam corresponding to the measurement result of the first beam is the first beam. The second beam has the measurement result of the second beam, or the second beam corresponds to the measurement result of the second beam, or the measurement result of the second beam belongs to the second beam, or a beam corresponding to the measurement result of the second beam is the second beam.

In another optional implementation, the middle measurement value includes a calculated average value of measurement values of the beams, or an average value calculated based on the maximum measurement value and the minimum measurement value, or a value that is in the middle of measurement values of the beams. In still another optional implementation, the processing unit is further configured to: the first beam includes a beam corresponding to a largest beam number, or a beam corresponding to a smallest beam number, or a beam corresponding to a middle beam number, in the beams, where the beam with the middle beam number is a beam corresponding to a beam number that is in the middle of a plurality of beam numbers.

In yet another optional implementation, the information of the beams includes a beam identifier corresponding to at least one of the measurement result of the first beam and the measurement result of the second beam, where the beam identifier is at least one of a beam identifier of the first beam to which the reference measurement result belongs and a beam identifier of the second beam to which the offset relative to the reference measurement result belongs.

In yet another optional implementation, the processing unit is further configured to determine that when the identifier of the second beam is explicitly indicated, the identifier of the second beam is the identifier of the second beam itself, or the identifier of the second beam is an offset relative to the identifier of the first beam.

In yet another optional implementation, the processing unit is further configured to determine that when the identifier of the second beam is implicitly indicated, the offsets of the measurement results of the second beams relative to the reference measurement result are sorted sequentially in ascending or descending order of beam numbers; or the offsets of the measurement results of the second beams relative to the reference measurement result are sorted sequentially in odd-number or even-number ascending order of beam numbers; or the offsets of the measurement results of the second beams relative to the reference measurement result are sorted sequentially in odd-number or even-number descending order of beam numbers; or the offsets of the measurement results of the second beams relative to the reference measurement result are sorted in a preset sorting manner.

In yet another optional implementation, the processing unit is further configured to determine that when the identifier of the second beam is implicitly indicated, the reference measurement result corresponding to the first beam is a beam measurement result corresponding to a beam with a largest beam number, and the offsets of the measurement results of the second beams relative to the reference measurement result are sorted sequentially in descending order of beam numbers; or the reference measurement result corresponding to the first beam is a beam measurement result corresponding to a beam with a smallest beam number, and the offsets of the measurement results of the second beams relative to the reference measurement result are sorted sequentially in ascending order of beam numbers; or measurement results, of the beams, that are greater than a preset threshold are sorted in a preset sorting manner.

In yet another optional implementation, at least one of the preset threshold and the preset sorting manner is sent from the radio access network device to the terminal by using at least one of radio resource control RRC signaling and media access control signaling; or at least one of the preset threshold and the preset sorting manner is preconfigured on the terminal.

In yet another optional implementation, the transceiver unit is further configured to receive indication information from the radio access network device, where the indication information is used to indicate whether the processing unit uses the first beam as a reference for UCI reporting or uses the measurement result of the first beam as a reference for UCI reporting.

In yet another optional implementation, when the indication information is used to instruct the processing unit to use the first beam as a reference, the indication information may further include a method for determining the first beam; or when the indication information is used to instruct the processing unit to use the measurement result of the first beam as a reference, the indication information may further include a method for determining the measurement result of the first beam as the reference measurement result.

In yet another optional implementation, the indication information is further used to indicate whether the UCI includes identifiers of the beams or contains only identifiers of the beams.

In yet another optional implementation, the indication information is further used to indicate that identifiers of beams corresponding to measurement results of the beams are explicitly indicated or implicitly indicated.

In yet another optional implementation, the indication information is further used to indicate that the UCI sent by the transceiver unit in the first format includes that the measurement result information of the beams is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beams, where the reference signal includes at least one of a synchronization signal, a synchronization signal resource identifier, a channel state information reference signal CSI-RS, and a CSI-RS resource identifier.

According to an eleventh aspect, an embodiment of this application provides a radio access network device. The radio access network device may specifically include a transceiver unit, configured to send indication information to a terminal, where the indication information is used to instruct the terminal whether to use a first beam group as a reference for uplink control information UCI reporting or use a measurement result of the first beam group as a reference for uplink control information UCI reporting; and the transceiver unit is further configured to receive UCI sent by the terminal in a first format, where the UCI includes at least one of measurement result information of beam groups and information of the beam groups, where the beam groups include the first beam group and a second beam group, the measurement result information of the beam groups includes a measurement result of the first beam group and an offset of a measurement result of the second beam group relative to the measurement result of the first beam group, the measurement result of the first beam group is a reference measurement result, and the information of the beam groups is used to indicate a beam group corresponding to at least one of the measurement result of the first beam group and the measurement result of the second beam group, where the beam group is one or more beam groups. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the indication information is further used to instruct the terminal whether to use the first beam group as a reference for UCI reporting or use the measurement result of the first beam group as a reference for UCI reporting.

In another optional implementation, the indication information is further used to instruct the terminal to determine the first beam group from a plurality of beam groups, and use the first beam group as a reference for UCI reporting or use the measurement result of the first beam group as a reference for UCI reporting.

In still another optional implementation, the indication information is further used to instruct the terminal whether to determine the first beam group by using a method for determining the first beam group.

In yet another optional implementation, the indication information is further used to indicate whether the UCI includes identifiers of the beam groups or contains only identifiers of the beam groups.

In yet another optional implementation, the indication information is further used to indicate that identifiers of beam groups corresponding to measurement results of the beam groups are explicitly indicated or implicitly indicated.

In yet another optional implementation, the indication information is further used to indicate that the UCI sent by the terminal in the first format includes that the measurement result information of the beam groups is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beam groups, where the reference signal includes at least one of a synchronization signal, a synchronization signal resource identifier, a channel state information reference signal CSI-RS, and a CSI-RS resource identifier.

In yet another optional implementation, the indication information is indicated by using at least one of radio resource control signaling, media access control signaling, and physical layer signaling.

According to a twelfth aspect, an embodiment of this application provides a radio access network device. The radio access network device may specifically include a transceiver unit, configured to send indication information to a terminal, where the indication information is used to instruct the terminal Whether to use a first beam as a reference for uplink control information UCI reporting or use a measurement result of the first beam as a reference for uplink control information UCI reporting; and the transceiver unit is further configured to receive UCI sent by the terminal in a first format, where the UCI includes at least one of measurement result information of beams and information of the beams, where the beams include the first beam and a second beam, the measurement result information of the beams includes a measurement result of the first beam and an offset of a measurement result of the second beam relative to the measurement result of the first beam, the measurement result of the first beam is a reference measurement result, and the information of the beams is used to indicate a beam corresponding to at least one of the measurement result of the first beam and the measurement result of the second beam, where the beam is one or more beams. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

According to this solution, a problem of beam-based uplink control information reporting in a millimeter-wave system is resolved, and beam measurement, and measurement result reporting by using uplink control information are implemented, thereby properly utilizing resources and reducing reporting overheads.

In an optional implementation, the indication information is further used to instruct the terminal whether to use the first beam as a reference for UCI reporting or use the measurement result of the first beam as a reference for UCI reporting.

In another optional implementation, the indication information is further used to instruct the terminal to determine the first beam from a plurality of beams, and use the first beam as a reference for UCI reporting or use the measurement result of the first beam as a reference for UCI reporting.

In still another optional implementation, the indication information is further used to instruct the terminal whether to determine the first beam group by using a method for determining the first beam group.

In yet another optional implementation, the indication information is further used to indicate whether the UCI includes identifiers of the beams or contains only identifiers of the beams.

In yet another optional implementation, the indication information is further used to indicate that identifiers of beams corresponding to measurement results of the beams are explicitly indicated or implicitly indicated.

In yet another optional implementation, the indication information is further used to indicate that the UCI sent by the terminal in the first format includes that the measurement result information of the beams is multiplexed with a hybrid automatic repeat request HARQ, or includes a HARQ multiplexing format.

In yet another optional implementation, the indication information is further used to indicate a reference signal for measurement or the reference signal used as a basis for reporting the measurement results of the beams, where the reference signal includes at least one of a synchronization signal, a synchronization signal resource identifier, a channel state information reference signal CSI-RS, and a CSI-RS resource identifier.

According to a twelfth aspect, an embodiment of the present invention provides a computer storage medium, where the computer storage medium stores an instruction, and when the instruction is run on a computer, the computer is enabled to perform the method in any possible design of the first aspect and the second aspect.

According to a thirteenth aspect, an embodiment of the present invention provides a computer program product, where the computer program product includes an instruction, and when a program is executed by a computer, the instruction enables the computer to perform the method in any possible design of the first aspect and the second aspect.

According to a fourteenth aspect, an embodiment of the present invention provides a computer program, where the computer program includes an instruction, and when the program is executed by a computer, the instruction enables the computer to perform the method in any possible design of the first aspect and the second aspect.

DESCRIPTION OF EMBODIMENTS

To facilitate understanding of embodiments of the present invention, the following provides further explanations and descriptions with reference to the accompanying drawings by using specific embodiments. The embodiments do not constitute any limitation on the embodiments of the present invention.

The embodiments of the present invention provide a data transmission method, a radio access network device, and a terminal, so as to perform measurement on grouped beam groups and send UCI in a first format. This resolves a problem of beam group-based uplink control information reporting in a millimeter-wave system. Therefore, in this solution, beam management can be effectively implemented, reporting information of uplink control information in the first format is more accurate, and reporting overheads can be reduced.

Figure 1:
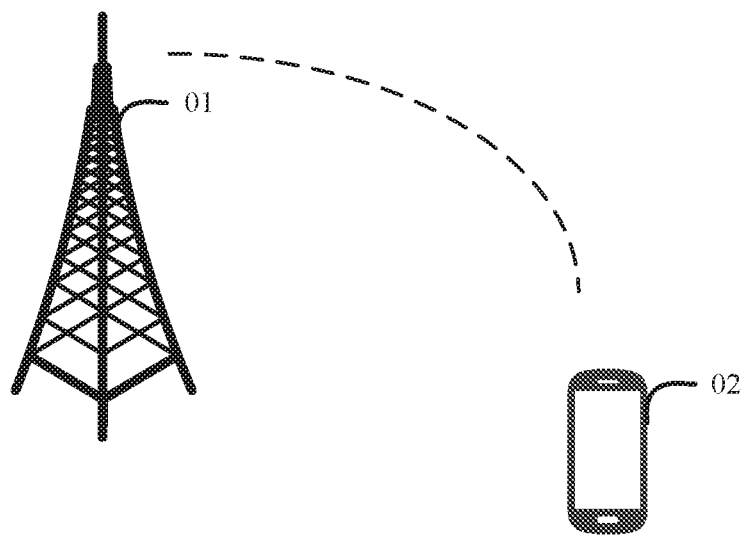
FIG. 1 is a schematic architectural diagram of a communications system according to an embodiment of the present invention.

FIG. 1 is a schematic architectural diagram of a communications system according to an embodiment of the present invention. As shown in FIG. 1, the communications system includes a radio access network device 01 and a terminal 02. In a possible embodiment, there may be more than one terminal 02, and FIG. 1 shows only one terminal 02 as an example for description.

Technologies described in the embodiments of the present invention may be applied to a high frequency system or a wireless communications system in other frequency domain. In addition, the technologies may also be applicable to a 5th generation 5G system, a new radio (new radio, NR) system, or the like.

In this application, the terms "system" and "network" are usually used alternately, and a person skilled in the art can understand their meanings. The radio access network device 01 in this application is a network device deployed in a radio access network to provide a wireless communication function for a terminal. The radio access network device 01 may include various forms, for example, a 5G base station, a new radio base station (new radio eNB or eNodeB), a transmission and reception point (transmission and reception point, TRP), a macro base station, a micro base station, a relay station, a high-frequency base station, and a long term evolution (long term evolution, LTE) macro base station. In systems using different radio access technologies, a device having a base station function may have different names. For example, the device is referred to as an evolved NodeB (evolved NodeB, eNB or eNodeB) in an LTE network, and is referred to as a new radio NodeB (new radio NodeB, NR-NB) in a 5th generation 5G or NR network. In addition, the terminal 02 in this application may include various types, for example, a handheld device, an in-vehicle device, a wearable device (wearable device, WD), and a computing device that have a wireless communication function, or another processing device connected to a wireless modem; and include various forms, for example, a mobile station (mobile station, MS), a terminal (terminal), and a terminal equipment (terminal equipment).

For ease of description, the terminal in this application may be, for example, UE, and the radio access network device providing a wireless communication function for the UE may be, for example, a base station.

Figure 2:
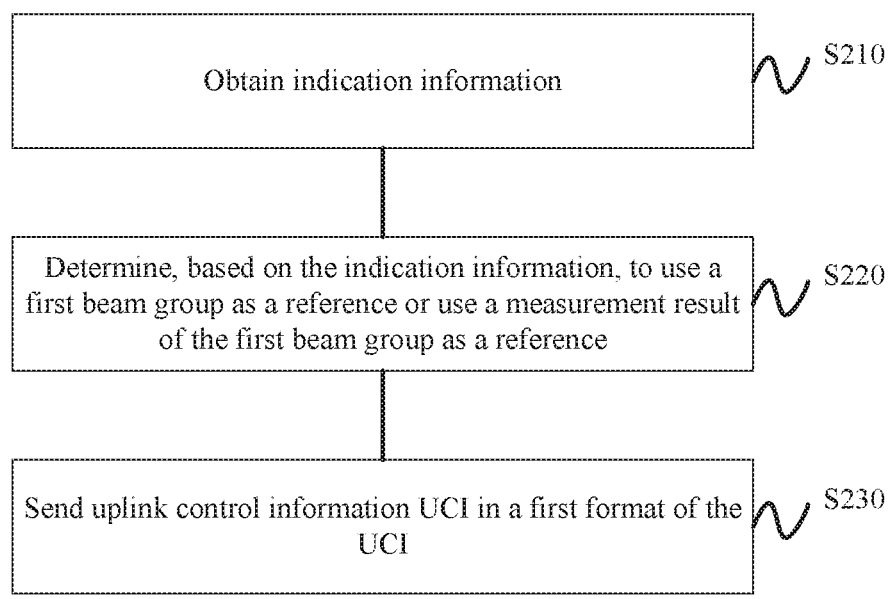
FIG. 2 is a schematic flowchart of a beam group-based data transmission method according to an embodiment of the present invention.

Currently, grouping-based beams are studied in the 5G background. In this application, a beam group is defined as follows: For one or more transmission and reception points, a plurality of transmit beams and/or receive beams are grouped into a beam set, or a plurality of transmit beam pairs and/or receive beam pairs are grouped into a beam pair set. For one UE, a plurality of transmit beams and/or receive beams are grouped into a beam set, or a plurality of transmit beam pairs and/or receive beam pairs are grouped into a beam pair set. The beam group may include at least one beam. Grouping may be grouping beams by a base station to determine a beam group, or grouping beams by UE to determine a beam group. However, whether group-based reporting is performed may be indicated by the base station by using indication information. Correspondingly, FIG. 2 is a schematic flowchart of a beam group-based data transmission method according to an embodiment of the present invention. FIG. 2 uses an example in which UE uses at least one of a first beam group of at least one beam group and a measurement result of the first beam group as a reference for uplink control information UCI reporting. As shown in FIG. 2, this embodiment includes steps S210 to S230. Details are given below.

S210: The UE obtains indication information.

Specifically, the UE may obtain the indication information by receiving the indication information from a base station or by obtaining the indication information based on information preconfigured on the UE. The indication information may include any one or more of the following content. It should be noted that any one or more of the following content may be obtained from the base station and the rest is preconfigured.

The indication information may be used to instruct the UE whether to perform beam group-based reporting.

The indication information may be further used to instruct the UE whether to group beams with an identical characteristic into one group. The identical characteristic may be any one or more of an identical subcarrier spacing, an identical waveform, or measurement values that can be grouped into one group.

The indication information may be further used to instruct the UE whether to use a first beam group as a reference for UCI reporting or use a measurement result of the first beam group as a reference for UCI reporting, where the measurement result of the first beam group is a reference measurement result. A method for determining to use the first beam group as a reference may include: The first beam group may be a beam group with a largest beam group number, or a beam group with a smallest beam group number, or a beam group with a middle beam group number. The first beam group may alternatively be a beam group with a maximum measurement value, or a beam group with a minimum measurement value, or a beam group with a middle measurement value. A method for determining to use the measurement result of the first beam group as the reference measurement result may include: The measurement result of the first beam group may be a measurement result of a beam group with a largest beam group number, or a measurement result of a beam group with a smallest beam group number, or a measurement result of a beam group with a middle beam group number. The measurement result of the first beam group may be a beam group measurement result corresponding to a beam group with a maximum measurement value, or a beam group measurement result corresponding to a beam group with a minimum measurement value, or a beam group measurement result corresponding to a beam group with a middle measurement value. A measurement value may be a value corresponding to a measurement result, or a measurement value may be used to obtain a corresponding measurement result based on a mapping relationship. A method for determining the middle measurement value includes: determining, in measurement values of a plurality of beam groups, the middle measurement value based on an average value calculated based on the plurality of measurement values, or an average value calculated based on the maximum measurement value and the minimum measurement value; or selecting a value that is in the middle of the measurement values of the plurality of beam groups as a middle measurement result value.

The indication information may be further used to indicate that the UCI sent by the UE in the first format includes that identifier of a beam group is explicitly indicated or implicitly indicated.

When the indication information is used to instruct the UE to use the first beam group as a reference, the indication information may further include a method for determining the first beam group.

When the indication information is used to instruct the UE to use the measurement result of the first beam group as a reference, the indication information may further include a method for determining the measurement result of the first beam group as the reference measurement result.

The indication information is further used to indicate whether the UCI includes identifiers of the beam groups or contains only identifiers of the beam groups.

The indication information is further used to indicate that identifiers of beam groups corresponding to measurement results of the beam groups are explicitly indicated or implicitly indicated.

The indication information is further used to indicate that the UCI sent by the UE in the first format includes that the measurement result information of the beam group is multiplexed with a hybrid automatic repeat request HARQ, or includes a HARQ multiplexing format.

The indication information is further used to indicate a reference signal for measurement or a reference signal used as a basis for reporting the measurement results of the beam groups, where the reference signal includes at least one of a synchronization signal, a synchronization signal resource identifier, a channel state information reference signal CSI-RS, and a CSI-RS resource identifier.

It should be noted that the indication information may be indicated by using at least one of radio resource control (radio resource control, RRC) signaling, media access control (media access control, MAC) signaling, and physical layer signaling.

S220: The UE determines, based on the indication information, to use the first beam group as a reference or use the measurement result of the first beam group as a reference.

Specifically, the UE measures each beam, groups the beams into a beam group, and determines a beam group identifier for the grouped beam group and a corresponding measurement result of the beam group.

In a possible embodiment, grouping a beam group means that the UE groups, based on the indication information, beams containing an identical characteristic into one group, and groups the rest beams not containing an identical characteristic into one group. For the beams not containing an identical characteristic, there may be a beam group with only one beam. In this case, the beam group includes only one beam. Grouping the beams containing an identical characteristic into one group may be beam grouping based on whether the beams have an identical subcarrier spacing, to group beams with an identical subcarrier spacing into one beam group; or may be beam grouping based on whether the beams have an identical waveform, to group beams with an identical waveform into one beam group; or may be beam grouping based on whether the beams have close measurement values, to group beams with close measurement values into one beam group.

Determining the measurement result of the corresponding beam group is deducing a measurement value of the beam group based on measurement values of the beams, and obtaining the measurement result of the corresponding beam group based on a mapping relationship or a correspondence between a measurement value and a measurement result. The deducing the measurement value of the beam group based on the measurement values of the beams is deducing based on a linear or a non-linear function.

A manner of determining the first beam group by the UE may include: The UE determines a beam group with a largest beam group number as the first beam group, or the UE determines a beam group with a smallest beam group number as the first beam group, or the UE determines a beam group with a middle beam group number as the first beam group.

In another possible embodiment, when the indication information instructs to use the first beam group as a reference, and a method for determining the first beam group is to select a beam group with a largest beam group number as the first beam group, the UE determines the beam group with the largest beam group number as the first beam group based on the indication information.

In still another possible embodiment, when the indication information instructs to use the first beam group as a reference, and a method for determining the first beam group is to select a beam group with a smallest beam group number as the first beam group, the UE determines the beam group with the smallest beam group number as the first beam group based on the indication information.

In yet another possible embodiment, when the indication information instructs to use the first beam group as a reference, and a method for determining the first beam group is to select a beam group with a middle beam group number as the first beam group, the UE determines the beam group with the middle beam group number as the first beam group based on the indication information.

The manner of determining the first beam group by the UE may further include: The UE determines a beam group with a maximum measurement value as the first beam group, or the UE determines a beam group with a minimum measurement value as the first beam group, or the UE determines a beam group with a middle measurement value as the first beam group.

In yet another possible embodiment, when the indication information instructs to use the first beam group as a reference, and a method for determining the first beam group is to select a beam group with a maximum measurement value as the first beam group, the UE determines the beam group with the maximum measurement value as the first beam group based on the indication information.

In yet another possible embodiment, when the indication information instructs to use the first beam group as a reference, and a method for determining the first beam group is to select a beam group with a minimum measurement value as the first beam group, the UE determines the beam group with the minimum measurement value as the first beam group based on the indication information.

In yet another possible embodiment, when the indication information instructs to use the first beam group as a reference, and a method for determining the first beam group is to select a beam group with a middle measurement value as the first beam group, the UE determines the beam group with the middle measurement value as the first beam group based on the indication information.

The UE may determine the reference measurement result in a plurality of manners, which may specifically include the following manners.

Manner 1:

In measurement values of a plurality of beam groups, select a beam group measurement result corresponding to a beam group with a maximum measurement value as the reference measurement result, or select a beam group measurement result corresponding to a beam group with a minimum measurement value as the reference measurement result, or select a beam group measurement result corresponding to a beam group with a middle measurement value as the reference measurement result.

A method for determining the middle measurement value includes: determining, in the measurement values of the plurality of beam groups, the middle measurement value based on an average value calculated based on the plurality of measurement values, or an average value calculated based on the maximum measurement value and the minimum measurement value; or selecting a value that is in the middle of the measurement values of the plurality of beam groups as a middle measurement result value.

It should be noted that during determining of the first beam group, beam groups other than the first beam group in the plurality of beam groups are a second beam group, where the second beam group may include at least one of the plurality of beam groups. When the measurement result of the first beam group is determined to be used as the reference measurement result, measurement results of beam groups other than the measurement result of the first beam group in the measurement results of the plurality of beam groups are a measurement result of the second beam group.

Manner 2:

In beam group numbers of a plurality of beam groups, select a beam group measurement result corresponding to a beam group with a largest beam group number as the reference measurement result, or select a beam group measurement result corresponding to a beam group with a smallest beam group number as the reference measurement result, or select a beam group measurement result corresponding to a beam group with a middle beam group number as the reference measurement result, where the beam group with the middle beam group number is a beam group corresponding to a beam group number that is in the middle of the beam group numbers of the plurality of beam groups.

It should be noted that the UE may specify the beam group numbers for the plurality of beam groups, to determine the beam group numbers of the plurality of beam groups. Alternatively, a base station may group beam groups for the UE and deliver the beam group numbers.

In a possible embodiment, when the indication information instructs to use the measurement result of the first beam group as the reference measurement result, and the method for determining the reference measurement result is to select a beam group measurement result corresponding to a beam group with a maximum measurement value, the UE determines, based on the indication information, the beam group measurement result corresponding to the beam group with the maximum measurement value as the reference measurement result.

In another possible embodiment, when the indication information instructs to use the measurement result of the first beam group as the reference measurement result, and the method for determining the reference measurement result is to select a beam group measurement result corresponding to a beam group with a minimum measurement value, the UE determines, based on the indication information, the beam group measurement result corresponding to the beam group with the minimum measurement value as the reference measurement result.

In still another possible embodiment, when the indication information instructs to use the measurement result of the first beam group as the reference measurement result, and the method for determining the reference measurement result is to select a beam group measurement result corresponding to a beam group with a middle measurement value, the UE determines, based on the indication information, the beam group measurement result corresponding to the beam group with the middle measurement value as the reference measurement result.

In yet another possible embodiment, when the indication information instructs to use the measurement result of the first beam group as the reference measurement result, and the method for determining the reference measurement result is to select a beam group measurement result corresponding to a beam group with a largest beam group number, the UE determines, based on the indication information, the beam group measurement result corresponding to the beam group with the largest beam group number as the reference measurement result.

In yet another possible embodiment, when the indication information instructs to use the measurement result of the first beam group as the reference measurement result, and the method for determining the reference measurement result is to select a beam group measurement result corresponding to a beam group with a smallest beam group number, the UE determines, based on the indication information, the beam group measurement result corresponding to the beam group with the smallest beam group number as the reference measurement result.

In yet another possible embodiment, when the indication information instructs to use the measurement result of the first beam group as the reference measurement result, and the method for determining the reference measurement result is to select a beam group measurement result corresponding to a beam group with a middle beam group number, the UE determines, based on the indication information, the beam group measurement result corresponding to the beam group with the middle beam group number as the reference measurement result.

S230: The UE sends uplink control information UCI in a first format of the UCI to the base station.

The UCI sent by the UE in the first format includes at least one of measurement result information of beam groups and information of the beam groups. The beam groups include the first beam group and the second beam group, and the measurement result information of the beam groups includes the measurement result of the first beam group and an offset of the measurement result of the second beam group relative to the measurement result of the first beam group. The measurement result of the first beam group is the reference measurement result. The information of the beam groups is used to indicate a beam group corresponding to at least one of the measurement result of the first beam group and the measurement result of the second beam group, where the beam group is one or more beam groups.

In a possible embodiment, the UCI sent in the first format includes the information of the beam groups. Specifically, the UCI sent in the first format further includes an identifier of the first beam group and an identifier of the second beam group, where the identifier of the first beam group is used as a reference.

In an embodiment, the UCI contains an identifier of a first beam and an identifier of a second beam, where the identifier of the second beam is the identifier of the second beam or an offset relative to the identifier of the first beam. There may be one or more second beams.

In an embodiment, the UCI contains an identifier of a beam corresponding to each of a measurement result of the first beam and a measurement result of the second beam, where the identifier of the first beam is used as a reference.

In another possible embodiment, the UCI sent in the first format includes the measurement result information of the beam groups. Specifically, determining a manner of UCI reporting based on an identifier of a beam group to which a measurement result of the beam group belongs may include:

Manner 1: the measurement result of the first beam group, the identifier of the first beam group, the measurement result of the second beam group, and the identifier of the second beam group, where the identifier of the first beam group is explicitly indicated, and the identifier of the second beam group is explicitly indicated.

Manner 2: the measurement result of the first beam group, the identifier of the first beam group, the measurement result of the second beam group, and the identifier of the second beam group, where the identifier of the first beam group is implicitly indicated, and the identifier of the second beam group is explicitly indicated.

Manner 3: the measurement result of the first beam group, the identifier of the first beam group, and the measurement result of the second beam group, where the identifier of the first beam group is explicitly indicated, and the identifier of the second beam group is implicitly indicated.

Manner 4: the measurement result of the first beam group, and the measurement result of the second beam group, where the identifier of the first beam group is implicitly indicated, and the identifier of the second beam group is implicitly indicated.

The foregoing implicit indication means no indication is needed. A correspondence between a beam group and a measurement result of the beam group may be parsed in a predefined or default manner.

In the foregoing manner 1 to manner 4:

In a possible embodiment, when the identifier of the second beam group is explicitly indicated, the identifier of the second beam group is the identifier of the second beam group itself, or the identifier of the second beam group is an offset relative to the identifier of the first beam group.

For example, when the identifier of the second beam group is explicitly indicated, and the identifier of the first beam group is "5", the identifier of the second beam group may be "6" or "1".

In this case, the identifier of the first beam group corresponds to the reference measurement result corresponding to the first beam group. In other words, the identifier of the first beam group is "5", and an identifier corresponding to the reference measurement result corresponding to the first beam group is also "5". In this case, the identifier of the second beam group may be "6", and an identifier corresponding to the measurement result corresponding to the second beam group may also be "6". Alternatively, the identifier of the second beam group is "1", that is, the identifier of the second beam group is an offset relative to the identifier of the first beam group, and an identifier corresponding to the measurement result corresponding to the second beam group is also "1".

In another possible embodiment, when the identifier of the second beam group is implicitly indicated, the beam groups are sorted sequentially in ascending or descending order of beam group numbers. It should be noted that the UE may specify the beam group numbers for the plurality of beam groups, to determine the beam group numbers of the plurality of beam groups. Alternatively, the base station may deliver the beam group numbers. For example, when the beam group numbers are 1, 2, 3 . . . M, beam groups 1, 2, 3 . . . M are sequentially sorted in one format for reporting. When the beam group numbers are x, x+1 . . . N, beam groups x, x+1 . . . N are sequentially sorted in one format for reporting. When the beam group numbers are M, M−1 . . . 1, beam groups M, M−1 . . . 1 are sequentially sorted in one format for reporting. When the beam group numbers are N, N−1 . . . x, beam groups N, N−1 . . . x are sequentially sorted in one format for reporting.

In still another possible embodiment, when the identifier of the second beam group is implicitly indicated, the beam groups are sorted sequentially in odd-number or even-number ascending order of beam group numbers.

For example, when the beam group numbers are 1, 2, 3 . . . M, beam groups 1, 3, 5 . . . M (if M is an odd number, the last beam group is a beam group M; if M is an even number, the last beam group is a beam group M−1) are sequentially sorted in one format for reporting, and so on. When the beam group numbers are 1, 2, 3 . . . M, beam groups 2, 4, 6 . . . M (if M is an even number, the last beam group is a beam group M; if M is an odd number, the last beam group is a beam group M−1) are sequentially sorted in one format for reporting, and so on.

In yet another possible embodiment, when the identifier of the second beam group is implicitly indicated, the beam groups are sorted sequentially in odd-number or even-number descending order of beam group numbers.

In yet another possible embodiment, when the identifier of the second beam group is implicitly indicated, the beam groups are sorted in a preset sorting manner, that is, an order corresponding to a preset sequence design. The preset sorting manner is sent from the base station to the UE by using radio resource control RRC signaling or media access control signaling; or the preset sorting manner is configured on the UE through preconfiguration.

For example, when the beam group numbers are 1, 2, 3 . . . M, for beam groups 1, 3, 5 . . . M, a preset sequence design may be an unordered design according to a frequency hopping sequence.

In addition, the UCI sent in the first format includes the measurement result information of the beam groups and the information of the beam groups. Specifically, determining a manner of UCI reporting based on the measurement results of the beam groups may include:

the measurement result of the first beam group, the identifier of the first beam group, the measurement result of the second beam group, and the identifier of the second beam group, where the measurement result of the first beam group is the reference measurement result, information of the first beam group may be explicitly or implicitly indicated, and information of the second beam group may also be explicitly or implicitly indicated.

In a possible embodiment, the reference measurement result is a beam group measurement result corresponding to a beam group with a largest beam group number. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in descending or ascending order of beam group numbers.

In another possible embodiment, the reference measurement result is a beam group measurement result corresponding to a beam group with a smallest beam group number. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in ascending or descending order of beam group numbers.

In still another possible embodiment, the reference measurement result is a beam group measurement result corresponding to a beam group with a middle beam group number. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are in ascending order of beam group numbers from the smallest beam group number, or are in descending order of beam group numbers from the largest beam group number, or are in ascending order of beam group numbers from the middle beam group number to the largest beam group number and then are in descending order of beam group numbers from the middle beam group number to the smallest beam group number, or are in descending order of beam group numbers from the middle beam group number to the smallest beam group number and then are in ascending order of beam group numbers from the middle beam group number to the largest beam group number.

In yet another possible embodiment, the reference measurement result is a beam group measurement result corresponding to a beam group with a maximum measurement value. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in descending or ascending order of beam group numbers.

In yet another possible embodiment, the reference measurement result is a beam group measurement result corresponding to a beam group with a minimum measurement value. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group may be implicitly indicated, the offsets of the measurement results of the second beam groups relative to the reference measurement result are sorted sequentially in ascending or descending order of beam group numbers.

In yet another possible embodiment, the reference measurement result is a beam group measurement result corresponding to a beam group with a middle measurement value. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in ascending or descending order of beam group numbers.

In yet another possible embodiment, measurement results, of the beam groups, that are greater than a preset threshold are reported. The preset threshold is sent from the base station to the UE by using radio resource control RRC signaling or media access control signaling; or the preset threshold is configured on the UE through preconfiguration. An identifier of a beam group is explicitly indicated. In an embodiment, the measurement results are sorted and reported in a preset sorting manner, where the preset sorting manner may be any sequential sorting order in the foregoing manners.

For example, when offsets of measurement results relative to the reference measurement result are greater than the preset threshold, the offsets of the measurement results relative to the reference measurement result are sorted in the preset sorting manner, or when the measurement results are greater than the threshold, the measurement results are sorted in the preset sorting manner.

In the foregoing method, at least one of the preset threshold and the preset sorting manner is sent from the base station to the UE by using at least one of radio resource control RRC signaling and media access control signaling; or at least one of the preset threshold and the preset sorting manner is preconfigured on the UE.

In addition, the UCI sent by the UE in the first format further includes at least one of a reference signal for measurement and a reference signal used as a basis for reporting the measurement results of the beam groups, where the reference signal includes at least one of a synchronization signal, a synchronization signal resource identifier, a channel state information reference signal CSI-RS, and a CSI-RS resource identifier. The UE may alternatively skip reporting the reference signal, and performs measurement based on a reference signal specified in the indication information.

The base station may process the beam groups based on the UCI sent by the UE.

It should be noted that, in the foregoing three possible scenarios, when the first beam group includes a plurality of beam groups, the UE can determine one of the plurality of beam groups as a reference by using an averaging algorithm.

Any presetting, preconfiguration or pre-notification above may be notified by a network device to the UE by using RRC signaling or MAC signaling, or specified on the UE in advance.

The identifiers, numbers, or indexes described above are equivalent and interchangeable.

Figure 3:
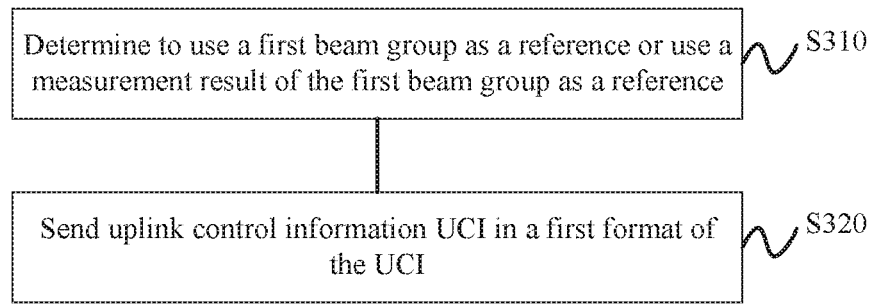
FIG. 3 is a schematic flowchart of another beam group-based data transmission method according to an embodiment of the present invention.

FIG. 3 is a schematic flowchart of another beam group-based data transmission method according to an embodiment of the present invention. As shown in FIG. 3, this embodiment includes steps S310 and S320. Details are given below.

S310: UE determines to use a first beam group as a reference or use a measurement result of the first beam group as a reference.

Specifically, the UE measures each beam, groups the beams into a beam group, and determines a beam group identifier for the grouped beam group and a corresponding measurement result of the beam group.

In a possible embodiment, grouping a beam group means that the UE groups beams containing an identical characteristic into one group, and groups the rest beams not containing an identical characteristic into one group. For the beams not containing an identical characteristic, there may be a beam group with only one beam. In this case, the beam group includes only one beam. Grouping the beams containing an identical characteristic into one group may be beam grouping based on whether the beams have an identical subcarrier spacing, to group beams with an identical subcarrier spacing into one beam group; or may be beam grouping based on whether the beams have an identical waveform, to group beams with an identical waveform into one beam group; or may be beam grouping based on whether the beams have close measurement values, to group beams with close measurement values into one beam group.

Determining the measurement result of the corresponding beam group is deducing a measurement value of the beam group based on measurement values of the beams, and obtaining the measurement result of the corresponding beam group based on a mapping relationship or a correspondence between a measurement value and a measurement result. The deducing the measurement value of the beam group based on the measurement values of the beams is deducing based on a linear or a non-linear function.

A manner of determining the first beam group by the UE, may include: The UE determines a beam group with a largest beam group number as the first beam group, or the UE determines a beam group with a smallest beam group number as the first beam group, or the UE determines a beam group with a middle beam group number as the first beam group.

In another possible embodiment, when the first beam group is used as a reference, and a method for determining the first beam group is to select a beam group with a largest beam group number as the first beam group, the UE determines the beam group with the largest beam group number as the first beam group.

In still another possible embodiment, when the first beam group is used as a reference, and a method for determining the first beam group is to select a beam group with a smallest beam group number as the first beam group, the UE determines the beam group with the smallest beam group number as the first beam group.

In yet another possible embodiment, when the first beam group is used as a reference, and a method for determining the first beam group is to select a beam group with a middle beam group number as the first beam group, the UE determines the beam group with the middle beam group number as the first beam group.

The manner of determining the first beam group by the UE may further include: The UE determines a beam group with a maximum measurement value as the first beam group, or the UE determines a beam group with a minimum measurement value as the first beam group, or the UE determines a beam group with a middle measurement value as the first beam group.

In yet another possible embodiment, when the first beam group is used as a reference, and a method for determining the first beam group is to select a beam group with a maximum measurement value as the first beam group, the UE determines the beam group with the maximum measurement value as the first beam group.

In yet another possible embodiment, when the first beam group is used as a reference, and a method for determining the first beam group is to select a beam group with a minimum measurement value as the first beam group, the UE determines the beam group with the minimum measurement value as the first beam group.

In yet another possible embodiment, when the first beam group is used as a reference, and a method for determining the first beam group is to select a beam group with a middle measurement value as the first beam group, the UE determines the beam group with the middle measurement value as the first beam group.

The UE may determine the reference measurement result in a plurality of manners, which may specifically include the following manners.

Manner 1:

In measurement values of a plurality of beam groups, select a beam group measurement result corresponding to a beam group with a maximum measurement value as the reference measurement result, or select a beam group measurement result corresponding to a beam group with a minimum measurement value as the reference measurement result, or select a beam group measurement result corresponding to a beam group with a middle measurement value as the reference measurement result.

A method for determining the middle measurement value includes: determining, in the measurement values of the plurality of beam groups, the middle measurement value based on an average value calculated based on the plurality of measurement values, or an average value calculated based on the maximum measurement value and the minimum measurement value or selecting a value that is in the middle of the measurement values of the plurality of beam groups as a middle measurement result value.

It should be noted that during determining of the first beam group, beam groups other than the first beam group in the plurality of beam groups are a second beam group, where the second beam group may include at least one of the plurality of beam groups. When the measurement result of the first beam group is determined to be used as the reference measurement result, measurement results of beam groups other than the measurement result of the first beam group in the measurement results of the plurality of beam groups are a measurement result of the second beam group.

Manner 2:

In beam group numbers of a plurality of beam groups, select a beam group measurement result corresponding to a beam group with a largest beam group number as the reference measurement result, or select a beam group measurement result corresponding to a beam group with a smallest beam group number as the reference measurement result, or select a beam group measurement result corresponding to a beam group with a middle beam group number as the reference measurement result, where the beam group with the middle beam group number is a beam group corresponding to a beam group number that is in the middle of the beam group numbers of the plurality of beam groups.

It should be noted that the UE may specify the beam group numbers for the plurality of beam groups, to determine the beam group numbers of the plurality of beam groups. Alternatively, a base station may group beam groups for the UE and deliver the beam group numbers.

In a possible embodiment, when the measurement result of the first beam group is used as the reference measurement result, and the method for determining the reference measurement result is to select a beam group measurement result corresponding to a beam group with a maximum measurement value, the UE determines the beam group measurement result corresponding to the beam group with the maximum measurement value as the reference measurement result.

In another possible embodiment, when the measurement result of the first beam group is used as the reference measurement result, and the method for determining the reference measurement result is to select a beam group measurement result corresponding to a beam group with a minimum measurement value, the UE determines the beam group measurement result corresponding to the beam group with the minimum measurement value as the reference measurement result.

In still another possible embodiment, when the measurement result of the first beam group is used as the reference measurement result, and the method for determining the reference measurement result is to select a beam group measurement result corresponding to a beam group with a middle measurement value, the UE determines the beam group measurement result corresponding to the beam group with the middle measurement value as the reference measurement result.

In yet another possible embodiment, when the measurement result of the first beam group is used as the reference measurement result, and the method for determining the reference measurement result is to select a beam group measurement result corresponding to a beam group with a largest beam group number, the UE determines the beam group measurement result corresponding to the beam group with the largest beam group number as the reference measurement result.

In yet another possible embodiment, when the measurement result of the first beam group is used as the reference measurement result, and the method for determining the reference measurement result is to select a beam group measurement result corresponding to a beam group with a smallest beam group number, the UE determines the beam group measurement result corresponding to the beam group with the smallest beam group number as the reference measurement result.

In yet another possible embodiment, when the measurement result of the first beam group is used as the reference measurement result, and the method for determining the reference measurement result is to select a beam group measurement result corresponding to a beam group with a middle beam group number, the UE determines the beam group measurement result corresponding to the beam group with the middle beam group number as the reference measurement result.

S320: The UE sends uplink control information UCI in a first format of the UCI to the base station.

The UCI sent by the UE in the first format includes at least one of measurement result information of beam groups and information of the beam groups. The beam groups include the first beam group and the second beam group, and the measurement result information of the beam groups includes the measurement result of the first beam group and an offset of the measurement result of the second beam group relative to the measurement result of the first beam group. The measurement result of the first beam group is the reference measurement result. The information of the beam groups is used to indicate a beam group corresponding to at least one of the measurement result of the first beam group and the measurement result of the second beam group, where the beam group is one or more beam groups.

In a possible embodiment, the UCI sent in the first format includes the information of the beam groups. Specifically, the UCI sent in the first format further includes an identifier of the first beam group and an identifier of the second beam group, where the identifier of the first beam group is used as a reference.

In an embodiment, the UCI contains an identifier of a first beam and an identifier of a second beam, where the identifier of the second beam is the identifier of the second beam or an offset relative to the identifier of the first beam. There may be one or more second beams.

In an embodiment, the UCI contains an identifier of a beam corresponding to each of a measurement result of the first beam and a measurement result of the second beam, where the identifier of the first beam is used as a reference.

In another possible embodiment, the UCI sent in the first format includes the measurement result information of the beam groups. Specifically, determining a manner of UCI reporting based on an identifier of a beam group to which a measurement result of the beam group belongs may include:

Manner 1: the measurement result of the first beam group, the identifier of the first beam group, the measurement result of the second beam group, and the identifier of the second beam group, where the identifier of the first beam group is explicitly indicated, and the identifier of the second beam group is explicitly indicated.

Manner 2: the measurement result of the first beam group, the identifier of the first beam group, the measurement result of the second beam group, and the identifier of the second beam group, where the identifier of the first beam group is implicitly indicated, and the identifier of the second beam group is explicitly indicated.

Manner 3: the measurement result of the first beam group, the identifier of the first beam group, and the measurement result of the second beam group, where the identifier of the first beam group is explicitly indicated, and the identifier of the second beam group is implicitly indicated.

Manner 4: the measurement result of the first beam group, and the measurement result of the second beam group, where the identifier of the first beam group is implicitly indicated, and the identifier of the second beam group is implicitly indicated.

The foregoing implicit indication means no indication is needed. A correspondence between a beam group and a measurement result of the beam group may be parsed in a predefined or default manner.

In the foregoing manner 1 to manner 4:

In a possible embodiment, when the identifier of the second beam group is explicitly indicated, the identifier of the second beam group is the identifier of the second beam group itself, or the identifier of the second beam group is an offset relative to the identifier of the first beam group.

For example, when the identifier of the second beam group is explicitly indicated, and the identifier of the first beam group is "5", the identifier of the second beam group may be "6" or "1".

In this case, the identifier of the first beam group corresponds to the reference measurement result corresponding to the first beam group. In other words, the identifier of the first beam group is "5", and an identifier corresponding to the reference measurement result corresponding to the first beam group is also "5". In this case, the identifier of the second beam group may be "6", and an identifier corresponding to the measurement result corresponding to the second beam group may also be "6". Alternatively, the identifier of the second beam group is "1", that is, the identifier of the second beam group is an offset relative to the identifier of the first beam group, and an identifier corresponding to the measurement result corresponding to the second beam group is also "1".

In another possible embodiment, when the identifier of the second beam group is implicitly indicated, the beam groups are sorted sequentially in ascending or descending order of beam group numbers. It should be noted that the UE may specify the beam group numbers for the plurality of beam groups, to determine the beam group numbers of the plurality of beam groups. Alternatively, the base station may deliver the beam group numbers. For example, when the beam group numbers are 1, 2, 3 . . . M, beam groups 1, 2, 3 . . . M are sequentially sorted in one format for reporting. When the beam group numbers are x, x+1 . . . N, beam groups x, x+1 . . . N are sequentially sorted in one format for reporting. When the beam group numbers are M, M−1 . . . 1, beam groups M, M−1 . . . 1 are sequentially sorted in one format for reporting. When the beam group numbers are N, N−1 . . . x, beam groups N, N−1 . . . x are sequentially sorted in one format for reporting.

In still another possible embodiment, when the identifier of the second beam group is implicitly indicated, the beam groups are sorted sequentially in odd-number or even-number ascending order of beam group numbers.

For example, when the beam group numbers are 1, 2, 3 . . . M, beam groups 1, 3, 5 . . . M (if M is an odd number, the last beam group is a beam group M; if M is an even number, the last beam group is a beam group M−1) are sequentially sorted in one format for reporting, and so on. When the beam group numbers are 1, 2, 3 . . . M, beam groups 2, 4, 6 . . . M (if M is an even number, the last beam group is a beam group M; if M is an odd number, the last beam group is a beam group M−1) are sequentially sorted in one format for reporting, and so on.

In yet another possible embodiment, when the identifier of the second beam group is implicitly indicated, the beam groups are sorted sequentially in odd-number or even-number descending order of beam group numbers.

In yet another possible embodiment, when the identifier of the second beam group is implicitly indicated, the beam groups are sorted in a preset sorting manner, that is, an order corresponding to a preset sequence design. The preset sorting manner is sent from the base station to the UE by using radio resource control RRC signaling or media access control signaling; or the preset sorting manner is configured on the UE through preconfiguration.

For example, when the beam group numbers are 1, 2, 3 . . . M, for beam groups 1, 3, 5 . . . M, a preset sequence design may be an unordered design according to a frequency hopping sequence.

In addition, the UCI sent in the first format includes the measurement result information of the beam groups and the information of the beam groups. Specifically, determining a manner of UCI reporting based on the measurement results of the beam groups may include:

the measurement result of the first beam group, the identifier of the first beam group, the measurement result of the second beam group, and the identifier of the second beam group, where the measurement result of the first beam group is the reference measurement result, information of the first beam group may be explicitly or implicitly indicated, and information of the second beam group may also be explicitly or implicitly indicated.

In a possible embodiment, the reference measurement result is a beam group measurement result corresponding to a beam group with a largest beam group number. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in descending or ascending order of beam group numbers.

In another possible embodiment, the reference measurement result is a beam group measurement result corresponding to a beam group with a smallest beam group number. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in ascending or descending order of beam group numbers.

In still another possible embodiment, the reference measurement result is a beam group measurement result corresponding to a beam group with a middle beam group number. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are in ascending order of beam group numbers from the smallest beam group number, or are in descending order of beam group numbers from the largest beam group number, or are in ascending order of beam group numbers from the middle beam group number to the largest beam group number and then are in descending order of beam group numbers from the middle beam group number to the smallest beam group number, or are in descending order of beam group numbers from the middle beam group number to the smallest beam group number and then are in ascending order of beam group numbers from the middle beam group number to the largest beam group number.

In yet another possible embodiment, the reference measurement result is a beam group measurement result corresponding to a beam group with a maximum measurement value. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in descending or ascending order of beam group numbers.

In yet another possible embodiment, the reference measurement result is a beam group measurement result corresponding to a beam group with a minimum measurement value. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group may be implicitly indicated, the offsets of the measurement results of the second beam groups relative to the reference measurement result are sorted sequentially in ascending or descending order of beam group numbers.

In yet another possible embodiment, the reference measurement result is a beam group measurement result corresponding to a beam group with a middle measurement value. The identifier of the first beam group may be explicitly or implicitly indicated. When the identifier of the first beam group is explicitly indicated, the identifier of the first beam group is an index of the first beam group. The identifier of the second beam group may be explicitly or implicitly indicated. When the identifier of the second beam group is implicitly indicated, the offsets of the measurement results of the second beam groups relative to the reference measurement result are sorted sequentially in ascending or descending order of beam group numbers.

In yet another possible embodiment, measurement results, of the beam groups, that are greater than a preset threshold are reported. The preset threshold is sent from the base station to the UE by using radio resource control RRC signaling or media access control signaling; or the preset threshold is configured on the UE through preconfiguration. An identifier of a beam group is explicitly indicated. In an embodiment, the measurement results are sorted and reported in a preset sorting manner, where the preset sorting manner may be any sequential sorting order in the foregoing manners.

For example, when offsets of measurement results relative to the reference measurement result are greater than the preset threshold, the offsets of the measurement results relative to the reference measurement result are sorted in the preset sorting manner, or when the measurement results are greater than the threshold, the measurement results are sorted in the preset sorting manner.

In the foregoing method, at least one of the preset threshold and the preset sorting manner is sent from the base station to the UE by using at least one of radio resource control RRC signaling and media access control signaling; or at least one of the preset threshold and the preset sorting manner is preconfigured on the UE.

In addition, the UCI sent by the UE in the first format further includes at least one of a reference signal for measurement and a reference signal used as a basis for reporting the measurement results of the beam groups, where the reference signal includes at least one of a synchronization signal, a synchronization signal resource identifier, a channel state information reference signal CSI-RS, and a CSI-RS resource identifier.

The base station may process the beam groups based on the UCI sent by the UE.

It should be noted that, in the foregoing three possible scenarios, when the first beam group includes a plurality of beam groups, the UE can determine one of the plurality of beam groups as a reference by using an averaging algorithm.

Any presetting, preconfiguration or pre-notification above may be notified by a network device to the UE by using RRC signaling or MAC signaling, or specified on the UE in advance.

The identifiers, numbers, or indexes described above are equivalent interchangeable.

Figure 4:
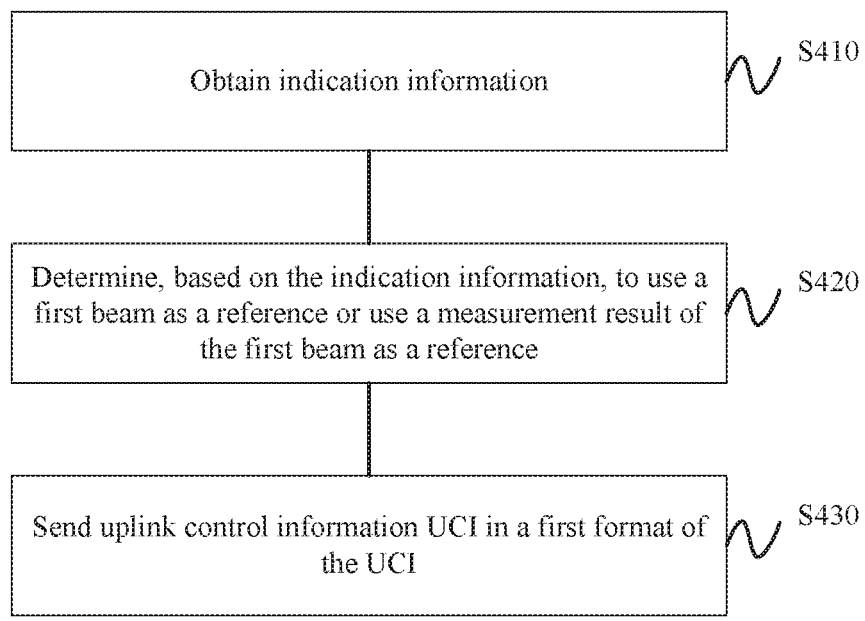
FIG. 4 is a schematic flowchart of a beam-based data transmission method according to an embodiment of the present invention.

FIG. 4 is a schematic flowchart of a beam-based data transmission method according to an embodiment of the present invention. FIG. 4 uses an example in which UE uses at least one of a first beam of at least one beam and a measurement result of the first beam as a reference for uplink control information UCI reporting. As shown in FIG. 4, this embodiment includes steps S410 to S430. Details are given below.

S410: The UE obtains indication information.

Specifically, the UE may obtain the indication information by receiving the indication information from a base station or by obtaining the indication information based on information preconfigured on the UE. The indication information may include any one or more of the following content. It should be noted that any one or more of the following content may be obtained from the base station and the rest is preconfigured.

The indication information may be used to instruct the UE whether to perform beam-based reporting.

The indication information may be further used to instruct the UE whether to group beams with an identical characteristic into one group. The identical characteristic may be any one or more of an identical subcarrier spacing, an identical waveform, or measurement values that can be grouped into one group.

The indication information may be further used to instruct the UE whether to use the first beam as a reference for UCI reporting or use the measurement result of the first beam as a reference for UCI reporting, where the measurement result of the first beam is a reference measurement result. A method for determining to use the first beam as a reference may include: The first beam may be a beam with a largest beam number, or a beam with a smallest beam number, or a beam with a middle beam number. The first beam may alternatively be a beam with a maximum measurement value, or a beam with a minimum measurement value, or a beam with a middle measurement value. A method for determining to use the measurement result of the first beam as the reference measurement result may include: The measurement result of the first beam may be a measurement result of a beam with a largest beam number, or a measurement result of a beam with a smallest beam number, or a measurement result of a beam with a middle beam number. The measurement result of the first beam may be a beam measurement result corresponding to a beam with a maximum measurement value, or a beam measurement result corresponding to a beam with a minimum measurement value, or a beam measurement result corresponding to a beam with a middle measurement value. A measurement value may be a value corresponding to a measurement result, or a measurement value may be used to obtain a corresponding measurement result based on a mapping relationship. A method for determining the middle measurement value includes: determining, in measurement values of a plurality of beams, the middle measurement value based on an average value calculated based on the plurality of measurement values, or an average value calculated based on the maximum measurement value and the minimum measurement value; or selecting a value that is in the middle of the measurement values of the plurality of beams as a middle measurement result value.

The indication information may be further used to indicate that the UCI sent by the UE in the first format includes that an identifier of a beam is explicitly indicated or implicitly indicated.

When the indication information is used to instruct the UE to use the first beam as a reference, the indication information may further include a method for determining the first beam.

When the indication information is used to instruct the UE to use the measurement result of the first beam as a reference, the indication information may further include a method for determining the measurement result of the first beam as the reference measurement result.

The indication information is further used to indicate whether the UCI includes identifiers of the beams or contains only identifiers of the beams.

The indication information is further used to indicate that identifiers of beams corresponding to measurement results of the beams are explicitly indicated or implicitly indicated.

The indication information is further used to indicate that the UCI sent by the UE in the first format includes that the measurement result information of the beam is multiplexed with a hybrid automatic repeat request HARQ, or includes a HARQ multiplexing format.

The indication information is further used to indicate a reference signal for measurement or a reference signal used as a basis for reporting the measurement result of the beam, where the reference signal includes at least one of a synchronization signal, a synchronization signal resource identifier, a channel state information reference signal CSI-RS, and a CSI-RS resource identifier.

It should be noted that the indication information may be indicated by using at least one of radio resource control (radio resource control, RRC) signaling, media access control (media access control, MAC) signaling, and physical layer signaling.

S420: The UE determines, based on the indication information, to use the first beam as a reference or use the measurement result of the first beam as a reference.

Specifically, the UE measures each beam, performs beam grouping, and determines a beam identifier for the grouped beam and a measurement result of the corresponding beam.

In a possible embodiment, beam grouping means that the UE groups, based on the indication information, beams containing an identical characteristic into one group, and groups the rest beams not containing an identical characteristic into one group. For the beams not containing an identical characteristic, there may be a beam with only one beam. In this case, the beam includes only one beam. Grouping the beams containing an identical characteristic into one group may be beam grouping based on whether the beams have an identical subcarrier spacing, to group beams with an identical subcarrier spacing into one beam; or may be beam grouping based on whether the beams have an identical waveform, to group beams with an identical waveform into one beam; or may be beam grouping based on whether the beams have close measurement values, to group beams with close measurement values into one beam.

Determining the measurement result of the corresponding beam is deducing a measurement value of the beam based on measurement values of the beams, and obtaining the measurement result of the corresponding beam based on a mapping relationship or a correspondence between a measurement value and a measurement result. The deducing the measurement value of the beam based on the measurement values of the beams is deducing based on a linear or a non-linear function.

A manner of determining the first beam by the UE may include: The UE determines a beam with a largest beam number as the first beam, or the UE determines a beam with a smallest beam number as the first beam, or the UE determines a beam with a middle beam number as the first beam.

In another possible embodiment, when the indication information instructs to use the first beam as a reference, and a method for determining the first beam is to select a beam with a largest beam number as the first beam, the UE determines the beam with the largest beam number as the first beam based on the indication information.

In still another possible embodiment, when the indication information instructs to use the first beam as a reference, and a method for determining the first beam is to select a beam with a smallest beam number as the first beam, the UE determines the beam with the smallest beam number as the first beam based on the indication information.

In yet another possible embodiment, when the indication information instructs to use the first beam as a reference, and a method for determining the first beam is to select a beam with a middle beam number as the first beam, the UE determines the beam with the middle beam number as the first beam based on the indication information.

The manner of determining the first beam by the UE may further include: The UE determines a beam with a maximum measurement value as the first beam, or the UE determines a beam with a minimum measurement value as the first beam, or the UE determines a beam with a middle measurement value as the first beam.

In yet another possible embodiment, when the indication information instructs to use the first beam as a reference, and a method for determining the first beam is to select a beam with a maximum measurement value as the first beam, the UE determines the beam with the maximum measurement value as the first beam based on the indication information.

In yet another possible embodiment, when the indication information instructs to use the first beam as a reference, and a method for determining the first beam is to select a beam with a minimum measurement value as the first beam, the UE determines the beam with the minimum measurement value as the first beam based on the indication information.

In yet another possible embodiment, when the indication information instructs to use the first beam as a reference, and a method for determining the first beam is to select a beam with a middle measurement value as the first beam, the UE determines the beam with the middle measurement value as the first beam based on the indication information.

The UE may determine the reference measurement result in a plurality of manners, which may specifically include the following manners.

Manner 1:

In measurement values of a plurality of beams, select a beam measurement result corresponding to a beam with a maximum measurement value as the reference measurement result, or select a beam measurement result corresponding to a beam with a minimum measurement value as the reference measurement result, or select a beam measurement result corresponding to a beam with a middle measurement value as the reference measurement result.

A method for determining the middle measurement value includes: determining, in the measurement values of the plurality of beams, the middle measurement value based on an average value calculated based on the plurality of measurement values, or an average value calculated based on the maximum measurement value and the minimum measurement value: or selecting a value that is in the middle of the measurement values of the plurality of beams as a middle measurement result value.

It should be noted that during determining of the first beam, beams other than the first beam in the plurality of beams are a second beam, where the second beam may include at least one of the plurality of beams. When the measurement result of the first beam is determined to be used as the reference measurement result, measurement results of beams other than the measurement result of the first beam in the measurement results of the plurality of beams are a measurement result of the second beam.

Manner 2:

In beam numbers of a plurality of beams, select a beam measurement result corresponding to a beam with a largest beam number as the reference measurement result, or select a beam measurement result corresponding to a beam with a smallest beam number as the reference measurement result, or select a beam measurement result corresponding to a beam with a middle beam number as the reference measurement result, where the beam with the middle beam number is a beam corresponding to a beam number that is in the middle of the beam numbers of the plurality of beams.

It should be noted that the UE may specify the beam numbers for the plurality of beams, to determine the beam numbers of the plurality of beams. Alternatively, a base station may perform beam grouping for the UE and deliver the beam numbers.

In a possible embodiment, when the indication information instructs to use the measurement result of the first beam as the reference measurement result, and the method for determining the reference measurement result is to select a beam measurement result corresponding to a beam with a maximum measurement value, the UE determines, based on the indication information, the beam measurement result corresponding to the beam with the maximum measurement value as the reference measurement result.

In another possible embodiment, when the indication information instructs to use the measurement result of the first beam as the reference measurement result, and the method for determining the reference measurement result is to select a beam measurement result corresponding to a beam with a minimum measurement value, the UE determines, based on the indication information, the beam measurement result corresponding to the beam with the minimum measurement value as the reference measurement result.

In still another possible embodiment, when the indication information instructs to use the measurement result of the first beam as the reference measurement result, and the method for determining the reference measurement result is to select a beam measurement result corresponding to a beam with a middle measurement value, the UE determines, based on the indication information, the beam measurement result corresponding to the beam with the middle measurement value as the reference measurement result.

In yet another possible embodiment, when the indication information instructs to use the measurement result of the first beam as the reference measurement result, and the method for determining the reference measurement result is to select a beam measurement result corresponding to a beam with a largest beam number, the UE determines, based on the indication information, the beam measurement result corresponding to the beam with the largest beam number as the reference measurement result.

In yet another possible embodiment, when the indication information instructs to use the measurement result of the first beam as the reference measurement result, and the method for determining the reference measurement result is to select a beam measurement result corresponding to a beam with a smallest beam number, the UE determines, based on the indication information, the beam measurement result corresponding to the beam with the smallest beam number as the reference measurement result.

In yet another possible embodiment, when the indication information instructs to use the measurement result of the first beam as the reference measurement result, and the method for determining the reference measurement result is to select a beam measurement result corresponding to a beam with a middle beam number, the UE determines, based on the indication information, the beam measurement result corresponding to the beam with the middle beam number as the reference measurement result.

S430: The UE sends uplink control information UCI in a first format of the UCI to the base station.

The UCI sent by the UE in the first format includes at least one of measurement result information of beams and information of the beams. The beams include the first beam and the second beam, and the measurement result information of the beams includes the measurement result of the first beam and an offset of the measurement result of the second beam relative to the measurement result of the first beam. The measurement result of the first beam is the reference measurement result. The information of the beams is used to indicate a beam corresponding to at least one of the measurement result of the first beam and the measurement result of the second beam, where the beam is one or more beams.

In a possible embodiment, the UCI sent in the first format includes the information of the beams. Specifically, the UCI sent in the first format further includes an identifier of the first beam and an identifier of the second beam, where the identifier of the first beam is used as a reference.

In an embodiment, the UCI contains the identifier of the first beam and the identifier of the second beam, where the identifier of the second beam is the identifier of the second beam or an offset relative to the identifier of the first beam. There may be one or more second beams.

In an embodiment, the UCI contains an identifier of a beam corresponding to each of the measurement result of the first beam and the measurement result of the second beam, where the identifier of the first beam is used as a reference.

In another possible embodiment, the UCI sent in the first format includes the measurement result information of the beams. Specifically, determining a manner of UCI reporting based on an identifier of a beam to which a measurement result of the beam belongs may include:

Manner 1: the measurement result of the first beam, the identifier of the first beam, the measurement result of the second beam, and the identifier of the second beam, where the identifier of the first beam is explicitly indicated, and the identifier of the second beam is explicitly indicated.

Manner 2: the measurement result of the first beam, the identifier of the first beam, the measurement result of the second beam, and the identifier of the second beam, where the identifier of the first beam is implicitly indicated, and the identifier of the second beam is explicitly indicated.

Manner 3: the measurement result of the first beam, the identifier of the first beam, and the measurement result of the second beam, where the identifier of the first beam is explicitly indicated, and the identifier of the second beam is implicitly indicated.

Manner 4: the measurement result of the first beam, and the measurement result of the second beam, where the identifier of the first beam is implicitly indicated, and the identifier of the second beam is implicitly indicated.

The foregoing implicit indication means no indication is needed. A correspondence between a beam and a measurement result of the beam may be parsed in a predefined or default manner.

In the foregoing manner 1 to manner 4:

In a possible embodiment, when the identifier of the second beam is explicitly indicated, the identifier of the second beam is the identifier of the second beam itself, or the identifier of the second beam is an offset relative to the identifier of the first beam.

For example, when the identifier of the second beam is explicitly indicated, and the identifier of the first beam is "5", the identifier of the second beam may be "6" or "1".

In this case, the identifier of the first beam corresponds to the reference measurement result corresponding to the first beam. In other words, the identifier of the first beam is "5", and an identifier corresponding to the reference measurement result corresponding to the first beam is also "5". In this case, the identifier of the second beam may be "6", and an identifier corresponding to the measurement result corresponding to the second beam may also be "6". Alternatively, the identifier of the second beam is "1", that is, the identifier of the second beam is an offset relative to the identifier of the first beam, and an identifier corresponding to the measurement result corresponding to the second beam is also "1".

In another possible embodiment, when the identifier of the second beam is implicitly indicated, the beams are sorted sequentially in ascending or descending order of beam numbers. It should be noted that the UE may specify the beam numbers for the plurality of beams, to determine the beam numbers of the plurality of beams. Alternatively, a base station may deliver the beam numbers. For example, when the beam numbers are 1, 2, 3 . . . M, beam groups 1, 2, 3 . . . M are sequentially sorted in one format for reporting. When the beam numbers are x, x+1 . . . N, beam groups x, x+1 . . . N are sequentially sorted in one format for reporting. When the beam numbers are M, M−1 . . . 1, beam groups M, M−1 . . . 1 are sequentially sorted in one format for reporting. When the beam numbers are N, N−1 . . . x, beam groups N, N−1 . . . x are sequentially sorted in one format for reporting.

In still another possible embodiment, when the identifier of the second beam is implicitly indicated, the beams are sorted sequentially in odd-number or even-number ascending order of beam numbers.

For example, when the beam numbers are 1, 2, 3 . . . M, beam groups 1, 3, 5 . . . M (if M is an odd number, the last beam group is a beam group M; if M is an even number, the last beam group is a beam group M−1) are sequentially sorted in one format for reporting, and so on. When the beam numbers are 1, 2, 3 . . . M, beam groups 2, 4, 6 . . . M (if M is an even number, the last beam group is a beam group M; if M is an odd number, the last beam group is a beam group M−1) are sequentially sorted in one format for reporting, and so on.

In yet another possible embodiment, when the identifier of the second beam is implicitly indicated, the beams are sorted sequentially in odd-number or even-number descending order of beam numbers.

In yet another possible embodiment, when the identifier of the second beam is implicitly indicated, the beams are sorted in a preset sorting manner, that is, an order corresponding to a preset sequence design. The preset sorting manner is sent from the base station to the UE by using radio resource control RRC signaling or media access control signaling; or the preset sorting manner is configured on the UE through preconfiguration.

For example, when the beam numbers are 1, 2, 3 ... M, for beam groups 1, 3, 5 ... M, a preset sequence design may be an unordered design according to a frequency hopping sequence.

In addition, the UCI sent in the first format includes the measurement result information of the beams and the information of the beams. Specifically, determining a manner of UCI reporting based on the measurement results of the beams may include:

the measurement result of the first beam, the identifier of the first beam, the measurement result of the second beam, and the identifier of the second beam, where the measurement result of the first beam is the reference measurement result, information of the first beam may be explicitly or implicitly indicated, and information of the second beam may also be explicitly or implicitly indicated.

In a possible embodiment, the reference measurement result is a beam measurement result corresponding to a beam with a largest beam number. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in descending or ascending order of beam numbers.

In another possible embodiment, the reference measurement result is a beam measurement result corresponding to a beam with a smallest beam number. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in ascending or descending order of beam numbers.

In still another possible embodiment, the reference measurement result is a beam measurement result corresponding to a beam with a middle beam number. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are in ascending order of beam numbers from the smallest beam number, or are in descending order of beam numbers from the largest beam number, or are in ascending order of beam numbers from the middle beam number to the largest beam number and then are in descending order of beam numbers from the middle beam number to the smallest beam number, or are in descending order of beam numbers from the middle beam number to the smallest beam number and then are in ascending order of beam numbers from the middle beam number to the largest beam number.

In yet another possible embodiment, the reference measurement result is a beam measurement result corresponding to a beam with a maximum measurement value. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in descending or ascending order of beam numbers.

In yet another possible embodiment, the reference measurement result is a beam measurement result corresponding to a beam with a minimum measurement value. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam may be implicitly indicated, the offsets of the measurement results of the second beams relative to the reference measurement result are sorted sequentially in ascending or descending order of beam numbers.

In yet another possible embodiment, the reference measurement result is a beam measurement result corresponding to a beam with a middle measurement value. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in ascending or descending order of beam numbers.

In yet another possible embodiment, measurement results, of the beams, that are greater than a preset threshold are reported. The preset threshold is sent from the base station to the UE by using radio resource control RRC signaling or media access control signaling; or the preset threshold is configured on the UE through preconfiguration. An identifier of a beam is explicitly indicated. In an embodiment, the measurement results are sorted and reported in a preset sorting manner, where the preset sorting manner may be any sequential sorting order in the foregoing manners.

For example, when offsets of measurement results relative to the reference measurement result are greater than the preset threshold, the offsets of the measurement results relative to the reference measurement result are sorted in the preset sorting manner, or when the measurement results are greater than the threshold, the measurement results are sorted in the preset sorting manner.

In the foregoing method, at least one of the preset threshold and the preset sorting manner is sent from the base station to the UE by using at least one of radio resource control RRC signaling and media access control signaling; or at least one of the preset threshold and the preset sorting manner is preconfigured on the UE.

In addition, the UCI sent by the UE in the first format further includes at least one of a reference signal for measurement and a reference signal used as a basis for reporting the measurement results of the beams, where the reference signal includes at least one of a synchronization signal, a synchronization signal resource identifier, a channel state information reference signal CSI-RS, and a CSI-RS resource identifier. The UE may alternatively skip reporting the reference signal, and performs measurement based on a reference signal specified in the indication information.

The base station may process the beams according to the UCI sent by the UE.

It should be noted that, in the foregoing three possible scenarios, when the first beam includes a plurality of beams, the UE can determine one of the plurality of beams as a reference by using an averaging algorithm.

Any presetting, preconfiguration or pre-notification above may be notified by a network device to the UE by using RRC signaling or MAC signaling, or specified on the UE in advance.

The identifiers, numbers, or indexes described above are equivalent and interchangeable.

Figure 5:
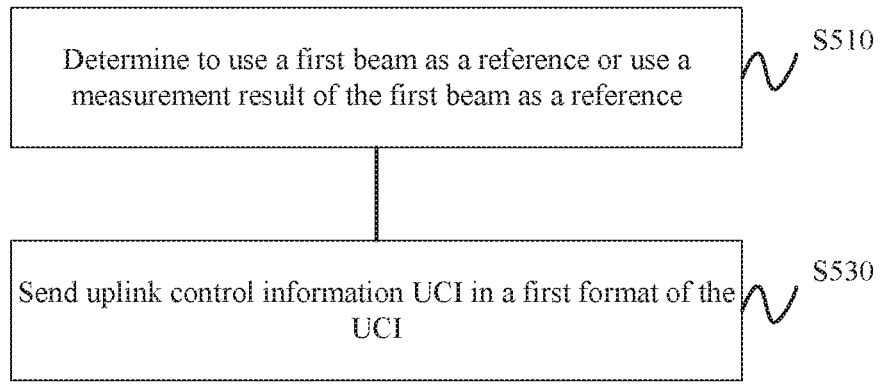
FIG. 5 is a schematic flowchart of another beam-based data transmission according to an embodiment of the present invention.

FIG. 5 is a schematic flowchart of another beam-based data transmission method according to an embodiment of the present invention. As shown in FIG. 5, this embodiment includes steps S510 and S520. Details are given below.

S510: UE determines to use a first beam as a reference or use a measurement result of the first beam as a reference.

Specifically, the UE measures each beam, performs beam grouping, and determines a beam identifier for the grouped beam and a measurement result of the corresponding beam.

In a possible embodiment, beam grouping means that the UE groups beams containing an identical characteristic into one group, and groups the rest beams not containing an identical characteristic into one group. For the beams not containing an identical characteristic, there may be a beam with only one beam. In this case, the beam includes only one beam. Grouping the beams containing an identical characteristic into one group may be beam grouping based on whether the beams have an identical subcarrier spacing, to group beams with an identical subcarrier spacing into one beam; or may be beam grouping based on whether the beams have an identical waveform, to group beams with an identical waveform into one beam; or may be beam grouping based on whether the beams have close measurement values, to group beams with close measurement values into one beam.

Determining the measurement result of the corresponding beam is deducing a measurement value of the beam based on measurement values of the beams, and obtaining the measurement result of the corresponding beam based on a mapping relationship or a correspondence between a measurement value and a measurement result. The deducing the measurement value of the beam based on the measurement values of the beams is deducing based on a linear or a non-linear function.

A manner of determining the first beam by the UE may include: The UE determines a beam with a largest beam number as the first beam, or the UE determines a beam with a smallest beam number as the first beam, or the UE determines a beam with a middle beam number as the first beam.

In another possible embodiment, when the first beam is used as a reference, and a method for determining the first beam is to select a beam with a largest beam number as the first beam, the UE determines the beam with the largest beam number as the first beam.

In still another possible embodiment, when the first beam is used as a reference, and a method for determining the first beam is to select a beam with a smallest beam number as the first beam, the UE determines the beam with the smallest beam number as the first beam.

In yet another possible embodiment, when the first beam is used as a reference, and a method for determining the first beam is to select a beam with a middle beam number as the first beam, the UE determines the beam with the middle beam number as the first beam.

The manner of determining the first beam by the UE may further include: The UE determines a beam with a maximum measurement value as the first beam, or the UE determines a beam with a minimum measurement value as the first beam, or the UE determines a beam with a middle measurement value as the first beam.

In yet another possible embodiment, when the first beam is used as a reference, and a method for determining the first beam is to select a beam with a maximum measurement value as the first beam, the UE determines the beam with the maximum measurement value as the first beam.

In yet another possible embodiment, when the first beam is used as a reference, and a method for determining the first beam is to select a beam with a minimum measurement value as the first beam, the UE determines the beam with the minimum measurement value as the first beam.

In yet another possible embodiment, when the first beam is used as a reference, and a method for determining the first beam is to select a beam with a middle measurement value as the first beam, the UE determines the beam with the middle measurement value as the first beam.

The UE may determine the reference measurement result in a plurality of manners, which may specifically include the following manners.

Manner 1:

In measurement values of a plurality of beams, select a beam measurement result corresponding to a beam with a maximum measurement value as the reference measurement result, or select a beam measurement result corresponding to a beam with a minimum measurement value as the reference measurement result, or select a beam measurement result corresponding to a beam with a middle measurement value as the reference measurement result.

A method for determining the middle measurement value includes: determining, in the measurement values of the plurality of beams, the middle measurement value based on an average value calculated based on the plurality of measurement values, or an average value calculated based on the maximum measurement value and the minimum measurement value; or selecting a value that is in the middle of the measurement values of the plurality of beams as a middle measurement result value.

It should be noted that during determining of the first beam, beams other than the first beam in the plurality of beams are a second beam, where the second beam may include at least one of the plurality of beams. When the measurement result of the first beam is determined to be used as the reference measurement result, measurement results of beams other than the measurement result of the first beam in the measurement results of the plurality of beams are a measurement result of the second beam.

Manner 2:

In beam numbers of a plurality of beams, select a beam measurement result corresponding to a beam with a largest beam number as the reference measurement result, or select a beam measurement result corresponding to a beam with a smallest beam number as the reference measurement result, or select a beam measurement result corresponding to a beam with a middle beam number as the reference measurement result, where the beam with the middle beam number is a beam corresponding to a beam number that is in the middle of the beam numbers of the plurality of beams.

It should be noted that the UE may specify the beam numbers for the plurality of beams, to determine the beam numbers of the plurality of beams. Alternatively, a base station may perform beam grouping for the UE and deliver the beam numbers.

In a possible embodiment, when the measurement result of the first beam is used as the reference measurement result, and the method for determining the reference measurement result is to select a beam measurement result corresponding to a beam with a maximum measurement value, the UE determines the beam measurement result corresponding to the beam with the maximum measurement value as the reference measurement result.

In another possible embodiment, when the measurement result of the first beam is used as the reference measurement result, and the method for determining the reference measurement result is to select a beam measurement result corresponding to a beam with a minimum measurement value, the UE determines the beam measurement result corresponding to the beam with the minimum measurement value as the reference measurement result.

In still another possible embodiment, when the measurement result of the first beam is used as the reference measurement result, and the method for determining the reference measurement result is to select a beam measurement result corresponding to a beam with a middle measurement value, the UE determines the beam measurement result corresponding to the beam with the middle measurement value as the reference measurement result.

In yet another possible embodiment, when the measurement result of the first beam is used as the reference measurement result, and the method for determining the reference measurement result is to select a beam measurement result corresponding to a beam with a largest beam number, the UE determines the beam measurement result corresponding to the beam with the largest beam number as the reference measurement result.

In yet another possible embodiment, when the measurement result of the first beam is used as the reference measurement result, and the method for determining the reference measurement result is to select a beam measurement result corresponding to a beam with a smallest beam number, the UE determines the beam measurement result corresponding to the beam with the smallest beam number as the reference measurement result.

In yet another possible embodiment, when the measurement result of the first beam is used as the reference measurement result, and the method for determining the reference measurement result is to select a beam measurement result corresponding to a beam with a middle beam number, the UE determines the beam measurement result corresponding to the beam with the middle beam number as the reference measurement result.

S520: The UE sends uplink control information UCI in a first format of the UCI to the base station.

The UCI sent by the UE in the first format includes at least one of measurement result information of beams and information of the beams. The beams include the first beam and the second beam, and the measurement result information of the beams includes the measurement result of the first beam and an offset of the measurement result of the second beam relative to the measurement result of the first beam. The measurement result of the first beam is the reference measurement result. The information of the beams is used to indicate a beam corresponding to at least one of the measurement result of the first beam and the measurement result of the second beam, where the beam is one or more beams.

In a possible embodiment, the UCI sent in the first format includes the information of the beams. Specifically, the UCI sent in the first format further includes an identifier of the first beam and an identifier of the second beam, where the identifier of the first beam is used as a reference.

In an embodiment, the UCI contains the identifier of the first beam and the identifier of the second beam, where the identifier of the second beam is the identifier of the second beam or an offset relative to the identifier of the first beam. There may be one or more second beams.

In an embodiment, the UCI contains an identifier of a beam corresponding to each of the measurement result of the first beam and the measurement result of the second beam, where the identifier of the first beam is used as a reference.

In another possible embodiment, the UCI sent in the first format includes the measurement result information of the beams. Specifically, determining a manner of UCI reporting based on an identifier of a beam to which a measurement result of the beam belongs may include:

Manner 1: the measurement result of the first beam, the identifier of the first beam, the measurement result of the second beam, and the identifier of the second beam, where the identifier of the first beam is explicitly indicated, and the identifier of the second beam is explicitly indicated.

Manner 2: the measurement result of the first beam, the identifier of the first beam, the measurement result of the second beam, and the identifier of the second beam, where the identifier of the first beam is implicitly indicated, and the identifier of the second beam is explicitly indicated.

Manner 3: the measurement result of the first beam, the identifier of the first beam, and the measurement result of the second beam, where the identifier of the first beam is explicitly indicated, and the identifier of the second beam is implicitly indicated.

Manner 4: the measurement result of the first beam, and the measurement result of the second beam, where the identifier of the first beam is implicitly indicated, and the identifier of the second beam is implicitly indicated.

The foregoing implicit indication means no indication is needed. A correspondence between a beam and a measurement result of the beam may be parsed in a predefined or default manner.

In the foregoing manner 1 to manner 4:

In a possible embodiment, when the identifier of the second beam is explicitly indicated, the identifier of the second beam is the identifier of the second beam itself, or the identifier of the second beam is an offset relative to the identifier of the first beam.

For example, when the identifier of the second beam is explicitly indicated, and the identifier of the first beam is "5", the identifier of the second beam may be "6" or "1".

In this case, the identifier of the first beam corresponds to the reference measurement result corresponding to the first beam. In other words, the identifier of the first beam is "5", and an identifier corresponding to the reference measurement result corresponding to the first beam is also "5". In this case, the identifier of the second beam may be "6", and an identifier corresponding to the measurement result corresponding to the second beam may also be "6". Alternatively, the identifier of the second beam is "1", that is, the identifier of the second beam is an offset relative to the identifier of the first beam, and an identifier corresponding to the measurement result corresponding to the second beam is also "1".

In another possible embodiment, when the identifier of the second beam is implicitly indicated, the beams are sorted sequentially in ascending or descending order of beam numbers. It should be noted that the UE may specify the beam numbers for the plurality of beams, to determine the beam numbers of the plurality of beams. Alternatively, a base station may deliver the beam numbers. For example, when the beam numbers are 1, 2, 3 . . . M, beam groups 1, 2, 3 . . . M are sequentially sorted in one format for reporting. When the beam numbers are x, x+1 . . . N, beam groups x, x+1 . . . N are sequentially sorted in one format for reporting. When the beam numbers are M, M−1 . . . 1, beam groups M, M−1 . . . 1 are sequentially sorted in one format for reporting. When the beam numbers are N, N−1 . . . x, beam groups N, N−1 . . . x are sequentially sorted in one format for reporting.

In still another possible embodiment, when the identifier of the second beam is implicitly indicated, the beams are sorted sequentially in odd-number or even-number ascending order of beam numbers.

For example, when the beam numbers are 1, 2, 3 . . . M, beam groups 1, 3, 5 . . . M (if M is an odd number, the last beam group is a beam group M; if M is an even number, the last beam group is a beam group M−1) are sequentially sorted in one format for reporting, and so on. When the beam numbers are 1, 2, 3 . . . M, beam groups 2, 4, 6 . . . M (if M is an even number, the last beam group is a beam group M; if M is an odd number, the last beam group is a beam group M−1) are sequentially sorted in one format for reporting, and so on.

In yet another possible embodiment, when the identifier of the second beam is implicitly indicated, the beams are sorted sequentially in odd-number or even-number descending order of beam numbers.

In yet another possible embodiment, when the identifier of the second beam is implicitly indicated, the beams are sorted in a preset sorting manner, that is, an order corresponding to a preset sequence design. The preset sorting manner is sent from the base station to the UE by using radio resource control RRC signaling or media access control signaling; or the preset sorting manner is configured on the UE through preconfiguration.

For example, when the beam numbers are 1, 2, 3 . . . M, for beam groups 1, 3, 5 . . . M, a preset sequence design may be an unordered design according to a frequency hopping sequence.

In addition, the UCI sent in the first format includes the measurement result information of the beams and the information of the beams. Specifically, determining a manner of UCI reporting based on the measurement results of the beams may include:

the measurement result of the first beam, the identifier of the first beam, the measurement result of the second beam, and the identifier of the second beam, where the measurement result of the first beam is the reference measurement result, information of the first beam may be explicitly or implicitly indicated, and information of the second beam may also be explicitly or implicitly indicated.

In a possible embodiment, the reference measurement result is a beam measurement result corresponding to a beam with a largest beam number. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in descending or ascending order of beam numbers.

In another possible embodiment, the reference measurement result is a beam measurement result corresponding to a beam with a smallest beam number. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in ascending or descending order of beam numbers.

In still another possible embodiment, the reference measurement result is a beam measurement result corresponding to a beam with a middle beam number. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are in ascending order of beam numbers from the smallest beam number, or are in descending order of beam numbers from the largest beam number, or are in ascending order of beam numbers from the middle beam number to the largest beam number and then are in descending order of beam numbers from the middle beam number to the smallest beam number, or are in descending order of beam numbers from the middle beam number to the smallest beam number and then are in ascending order of beam numbers from the middle beam number to the largest beam number.

In yet another possible embodiment, the reference measurement result is a beam measurement result corresponding to a beam with a maximum measurement value. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in descending or ascending order of beam numbers.

In yet another possible embodiment, the reference measurement result is a beam measurement result corresponding to a beam with a minimum measurement value. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam may be implicitly indicated, the offsets of the measurement results of the second beams relative to the reference measurement result are sorted sequentially in ascending or descending order of beam numbers.

In yet another possible embodiment, the reference measurement result is a beam measurement result corresponding to a beam with a middle measurement value. The identifier of the first beam may be explicitly or implicitly indicated. When the identifier of the first beam is explicitly indicated, the identifier of the first beam is an index of the first beam. The identifier of the second beam may be explicitly or implicitly indicated. When the identifier of the second beam is implicitly indicated, the offsets of the measurement results of the second beams relative to the reference measurement result are sorted sequentially in ascending or descending order of beam numbers.

In yet another possible embodiment, measurement results, of the beams, that are greater than a preset threshold are reported. The preset threshold is sent from the base station to the UE by using radio resource control RRC signaling or media access control signaling; or the preset threshold is configured on the UE through preconfiguration. An identifier of a beam is explicitly indicated. In an embodiment, the measurement results are sorted and reported in a preset sorting manner, where the preset sorting manner may be any sequential sorting order in the foregoing manners.

For example, when offsets of measurement results relative to the reference measurement result are greater than the preset threshold, the offsets of the measurement results relative to the reference measurement result are sorted in the preset sorting manner, or when the measurement results are greater than the threshold, the measurement results are sorted in the preset sorting manner.

In the foregoing method, at least one of the preset threshold and the preset sorting manner is sent from the base station to the UE by using at least one of radio resource control RRC signaling and media access control signaling; or at least one of the preset threshold and the preset sorting manner is preconfigured on the UE.

In addition, the UCI sent by the UE in the first format further includes at least one of a reference signal for measurement and a reference signal used as a basis for reporting the measurement results of the beams, where the reference signal includes at least one of a synchronization signal, a synchronization signal resource identifier, a channel state information reference signal CSI-RS, and a CSI-RS resource identifier.

The base station may process the beams according to the UCI sent by the UE.

It should be noted that, in the foregoing three possible scenarios, when the first beam includes a plurality of beams, the UE can determine one of the plurality of beams as a reference by using an averaging algorithm.

Any presetting, preconfiguration or pre-notification above may be notified by a network device to the UE by using RRC signaling or MAC signaling, or specified on the UE in advance.

The identifiers, numbers, or indexes described above are equivalent and interchangeable.

It should be noted that whether a measurement result of a beam group or a beam needs to be multiplexed with a hybrid automatic repeat request (hybrid automatic repeat request, HARQ) needs to be determined. If the measurement result needs to be multiplexed with the HARQ, the base station needs to make a configuration for the UE in advance with a corresponding multiplexing format. For example, a parameter simultaneous HARQ and BMR (beam management result) is configured by higher layer signaling. When the parameter is configured to be true (true), multiplexing between the HARQ and the measurement result of the beam is activated or enabled. All the higher layer signaling is RRC signaling sent by the base station to the UE. Reporting may be periodical, event-triggered, or periodically time-triggered.

In case of collision, the following rule is to be complied with: When there is periodical beam measurement result reporting and a HARQ-ACK in a time resource unit in which physical uplink shared channel (physical uplink shared channel, PUSCH) transmission is performed, the periodical beam measurement result reporting may be multiplexed with the HARQ-ACK in data transmission (for example, PUSCH transmission) in one time resource unit, provided that the UE is configured by the higher layer signaling to be incapable of performing PUCCH transmission and PUSCH transmission simultaneously, or the parameter simultaneous HARQ and BMR being temporary (false) is configured for the UE by the higher layer signaling. If the UE is configured by the higher layer signaling to be capable of performing PUCCH transmission and PUSCH transmission simultaneously, and if the UE determines that a PUCCH format is not used for periodical beam measurement result reporting and the HARQ-ACK, or the parameter simultaneous HARQ and BMR being false is configured for the UE by the higher layer signaling, the HARQ-ACK is transmitted on a PUCCH and periodical CSI is transmitted on a PUSCH. If the UE is configured by the higher layer signaling to be capable of performing PUCCH transmission and PUSCH transmission simultaneously, and if the UE determines that a PUCCH format is used for periodical beam measurement result reporting and the HARQ-ACK, and/or the parameter simultaneous HARQ and BMR being true is configured for the UE by the higher layer signaling, both periodical beam measurement result reporting and the HARQ-ACK are transmitted on a PUCCH.

Figure 6:
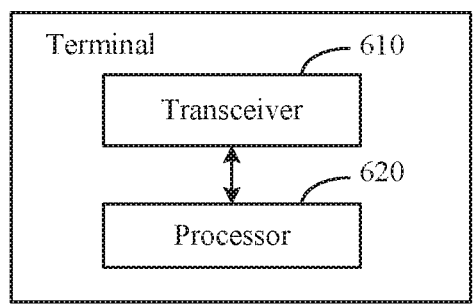
FIG. 6 is a schematic structural diagram of a beam group-based terminal according to an embodiment of the present invention.

FIG. 6 is a schematic structural diagram of a beam group-based terminal according to an embodiment of the present invention. As shown in FIG. 6, the terminal may specifically include a transceiver 610, configured to send uplink control information UCI in a first format of the UCI to a radio access network device, where the UCI sent in the first format includes at least one of measurement result information of beam groups and information of the beam groups, where the beam groups include a first beam group and a second beam group, the measurement result information of the beam groups includes a measurement result of the first beam group and an offset of a measurement result of the second beam group relative to the measurement result of the first beam group, the measurement result of the first beam group is a reference measurement result, and the information of the beam groups is used to indicate a beam group corresponding to at least one of the measurement result of the first beam group and the measurement result of the second beam group, where the beam group is one or more beam groups. When there are a plurality of second beam groups, beam groups corresponding to the measurement results of the second beam groups are a plurality of respectively corresponding beam groups. That is, the second beam groups include a third beam group and a fourth beam group. In this case, the measurement results of the second beam groups include a measurement result corresponding to the third beam group and a measurement result corresponding to the fourth beam group. It should be noted that the second beam groups include, but are not limited to, the third beam group and the fourth beam group, and may alternatively include N beam groups, where N is a positive integer.

The terminal may further include a processor 620, configured to determine the reference measurement result when there are a plurality of beam groups. The processor 620 is specifically configured to determine the reference measurement result based on measurement values of the plurality of beam groups, where a beam group measurement result corresponding to a beam group with a maximum measurement value in the measurement values of the plurality of beam groups is the reference measurement result, or a beam group measurement result corresponding to a beam group with a minimum measurement value is the reference measurement result, or a beam group measurement result corresponding to a beam group with a middle measurement value is the reference measurement result. A beam group is in one-to-one correspondence with a measurement result of the beam group. To be specific, the first beam group has the measurement result of the first beam group, or the first beam group corresponds to the measurement result of the first beam group, or the measurement result of the first beam group belongs to the first beam group, or a beam group corresponding to the measurement result of the first beam group is the first beam group. The second beam group has the measurement result of the second beam group, or the second beam group corresponds to the measurement result of the second beam group, or the measurement result of the second beam group belongs to the second beam group, or a beam group corresponding to the measurement result of the second beam group is the second beam group.

The processor 620 is further configured to determine the middle measurement value, and is specifically configured to calculate an average value of the measurement values of the plurality of beam groups, or to determine the middle measurement value based on an average value calculated based on the maximum measurement value and the minimum measurement value, or to select a value that is in the middle of the measurement values of the plurality of beam groups as the middle measurement result value.

The processor 620 is further configured to determine the reference measurement result when there are a plurality of beam groups, and is specifically configured to determine the reference measurement result based on beam group numbers. A beam group measurement result corresponding to a beam group with a largest beam group number in a plurality of beam group numbers is the reference measurement result, or a beam group measurement result corresponding to a beam group with a smallest beam group number is the reference measurement result, or a beam group measurement result corresponding to a beam group with a middle beam group number is the reference measurement result, where the beam group with the middle beam group number is a beam group corresponding to a beam group number that is in the middle of beam group numbers of the plurality of beam groups.

The information of the beam groups includes a beam group identifier corresponding to at least one of the measurement result of the first beam group and the measurement result of the second beam group, where the beam group identifier is at least one of a beam group identifier of the first beam group to which the reference measurement result belongs and a beam group identifier of the second beam group to which the offset relative to the reference measurement result belongs.

The processor 620 is further configured to determine that when the identifier of the second beam group is explicitly indicated, the identifier of the second beam group is the identifier of the second beam group itself, or the identifier of the second beam group is an offset relative to the identifier of the first beam group.

The processor 620 is further configured to determine that when the identifier of the second beam group is implicitly indicated, the offsets of the measurement results of the second beam groups relative to the reference measurement result are sorted sequentially in ascending or descending order of beam group numbers; or the offsets of the measurement results of the second beam groups relative to the reference measurement result are sorted sequentially in odd-number or even-number ascending order of beam group numbers; or the offsets of the measurement results of the second beam groups relative to the reference measurement result are sorted sequentially in odd-number or even-number descending order of beam group numbers; or the offsets of the measurement results of the second beam groups relative to the reference measurement result are sorted in a preset sorting manner.

The processor 620 is further configured to determine that when the identifier of the second beam group is implicitly indicated, the reference measurement result corresponding to the first beam group is a beam group measurement result corresponding to a beam group with a largest beam group, and the offsets of the measurement results of the second beam groups relative to the reference measurement result are sorted sequentially in descending order of beam group numbers; or the reference measurement result corresponding to the first beam group is a beam group measurement result corresponding to a beam group with a smallest beam group number, and the offsets of the measurement results of the second beam groups relative to the reference measurement result are sorted sequentially in ascending order of beam group numbers; or measurement results, of the beam groups, that are greater than a preset threshold are sorted in a preset sorting manner.

At least one of the preset threshold and the preset sorting manner is sent from the radio access network device to the terminal by using at least one of radio resource control RRC signaling and media access control signaling; or at least one of the preset threshold and the preset sorting manner is preconfigured on the terminal.

The transceiver 610 is further configured to receive indication information from the radio access network device, where the indication information is used to instruct the processor whether to use the first beam group as a reference for UCI reporting or use the measurement result of the first beam group as a reference for UCI reporting.

When the indication information is used to instruct the processor to use the first beam group as a reference, the indication information may further include a method for determining the first beam group; or when the indication information is used to instruct the processor to use the measurement result of the first beam group as a reference, the indication information may further include a method for determining the measurement result of the first beam group as the reference measurement result.

The indication information is further used to indicate whether the UCI includes identifiers of the beam groups or contains only identifiers of the beam groups.

The indication information is further used to indicate that identifiers of beam groups corresponding to measurement results of the beam groups are explicitly indicated or implicitly indicated.

The indication information is further used to indicate that the UCI sent by the transceiver in the first format includes that the measurement result information of the beam groups is multiplexed with a hybrid automatic repeat request HARQ, or includes a HARQ multiplexing format.

The indication information is further used to indicate a reference signal for measurement or the reference signal used as a basis for reporting the measurement results of the beam groups, where the reference signal includes at least one of a synchronization a synchronization signal resource identifier, a channel state information reference signal CSI-RS, and a CSI-RS resource identifier.

Figure 7:
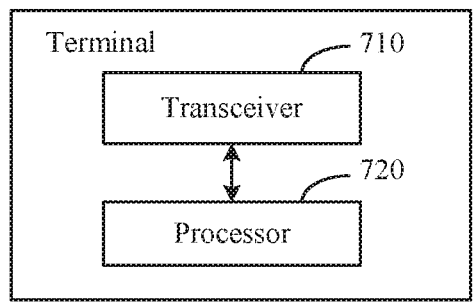
FIG. 7 is a schematic structural diagram of a beam-based terminal according to an embodiment of the present invention.

FIG. 7 is a schematic structural diagram of a beam-based terminal according to an embodiment of the present invention. As shown in FIG. 7, the terminal may specifically include a transceiver 710, configured to send uplink control information UCI in a first format of the UCI to a radio access network device, where the UCI sent in the first format includes at least one of measurement result information of beams and information of the beams, where the beams include a first beam and a second beam, the measurement result information of the beams includes a measurement result of the first beam and an offset of a measurement result of the second beam relative to the measurement result of the first beam, the measurement result of the first beam is a reference measurement result, and the information of the beams is used to indicate one or more beams corresponding to at least one of the measurement result of the first beam and the measurement result of the second beam, where the beam may be one or more beams. When there are a plurality of second beams, beams corresponding to the measurement results of the second beams are a plurality of respectively corresponding beams. That is, the second beams include a third beam and a fourth beam. In this case, the measurement results of the second beams include a measurement result corresponding to the third beam and a measurement result corresponding to the fourth beam. It should be noted that the second beams include, but are not limited to, the third beam and the fourth beam, and may alternatively include N beam groups, where N is a positive integer.

The terminal may further include a processor 720, configured to determine the reference measurement result when there are a plurality of beams. The processor 720 is specifically configured to determine the reference measurement result based on measurement values of the plurality of beams, where a beam measurement result corresponding to a beam with a maximum measurement value in the measurement values of the plurality of beams is the reference measurement result, or a beam measurement result corresponding to a beam with a minimum measurement value is the reference measurement result, or a beam measurement result corresponding to a beam with a middle measurement value is the reference measurement result. A beam is in one-to-one correspondence with a measurement result of the beam. To be specific, the first beam has the measurement result of the first beam, or the first beam corresponds to the measurement result of the first beam, or the measurement result of the first beam belongs to the first beam, or a beam corresponding to the measurement result of the first beam is the first beam. The second beam has the measurement result of the second beam, or the second beam corresponds to the measurement result of the second beam, or the measurement result of the second beam belongs to the second beam, or a beam corresponding to the measurement result of the second beam is the second beam.

The processor 720 is further configured to determine the middle measurement value, and is specifically configured to calculate an average value of the measurement values of the plurality of beams, or to determine the middle measurement value based on an average value calculated based on the maximum measurement value and the minimum measurement value, or to select a value that is in the middle of the measurement values of the plurality of beams as the middle measurement result value.

The processor 720 is further configured to determine the reference measurement result when there are a plurality of beams, and is specifically configured to determine the reference measurement result based on beam numbers. A beam measurement result corresponding to a beam with a largest beam number in a plurality of beam numbers is the reference measurement result, or a beam measurement result corresponding to a beam with a smallest beam number is the reference measurement result, or a beam measurement result corresponding to a beam with a middle beam number is the reference measurement result, where the beam with the middle beam number is a beam corresponding to a beam number that is in the middle of beam numbers of the plurality of beams.

The information of the beams includes a beam identifier corresponding to at least one of the measurement result of the first beam and the measurement result of the second beam, where the beam identifier is at least one of a beam identifier of the first beam to which the reference measurement result belongs and a beam identifier of the second beam to which the offset relative to the reference measurement result belongs.

The processor 720 is further configured to determine that when the identifier of the second beam is explicitly indicated, the identifier of the second beam is the identifier of the second beam itself, or the identifier of the second beam is an offset relative to the identifier of the first beam.

The processor 720 is further configured to determine that when the identifier of the second beam is implicitly indicated, the offsets of the measurement results of the second beams relative to the reference measurement result are sorted sequentially in ascending or descending order of beam numbers; or the offsets of the measurement results of the second beams relative to the reference measurement result are sorted sequentially in odd-number or even-number ascending order of beam numbers; or the offsets of the measurement results of the second beams relative to the reference measurement result are sorted sequentially in odd-number or even-number descending order of beam numbers; or the offsets of the measurement results of the second beams relative to the reference measurement result are sorted in a preset sorting manner.

The processor 720 is further configured to determine that when the identifier of the second beam is implicitly indicated, the reference measurement result corresponding to the first beam is a beam measurement result corresponding to a beam with a largest beam number, and the offsets of the measurement results of the second beams relative to the reference measurement result are sorted sequentially in descending order of beam numbers; or the reference measurement result corresponding to the first beam is a beam measurement result corresponding to a beam with a smallest beam number, and the offsets of the measurement results of the second beams relative to the reference measurement result are sorted sequentially in ascending order of beam numbers; or measurement results, of the beams, that are greater than a preset threshold are sorted in a preset sorting manner.

At least one of the preset threshold and the preset sorting manner is sent from the radio access network device to the terminal by using at least one of radio resource control RRC signaling and media access control signaling; or at least one of the preset threshold and the preset sorting manner is preconfigured on the terminal.

The transceiver 710 is further configured to receive indication information from the radio access network device, where the indication information is used to instruct the processor whether to use the first beam as a reference for UCI reporting or use the measurement result of the first beam as a reference for UCI reporting.

When the indication information is used to instruct the processor to use the first beam as a reference, the indication information may further include a method for determining the first beam; or when the indication information is used to instruct the processor to use the measurement result of the first beam as a reference, the indication information may further include a method for determining the measurement result of the first beam as the reference measurement result.

The indication information is further used to indicate whether the UCI includes identifiers of the beams or contains only identifiers of the beams.

The indication information is further used to indicate that identifiers of beams corresponding to measurement results of the beams are explicitly indicated or implicitly indicated.

The indication information is further used to indicate that the UCI sent by the transceiver in the first format includes that the measurement result information of the beams is multiplexed with a hybrid automatic repeat request HARQ, or includes a HARQ multiplexing format.

The indication information is further used to indicate a reference signal for measurement or the reference signal used as a basis for reporting the measurement results of the beams, where the reference signal includes at least one of a synchronization signal, a synchronization signal resource identifier, a channel state information reference signal CSI-RS, and a CSI-RS resource identifier.

In the method provided in the embodiments of the present invention, a grouped beam group or beam is measured based on an indication message, to determine a measurement result. Beam grouping helps reduce beam management costs. In addition, a problem of beam grouping-based uplink control information reporting in a millimeter-wave system is resolved, and grouped beam group and beam measurement, and measurement result reporting by using uplink control information are implemented, thereby properly utilizing resources and reducing reporting overheads.

A person skilled in the art may be further aware that the units and algorithm steps in examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use a different method to implement the described functions for each particular application, but it should not be considered that the implementation goes beyond the scope of this application.

A person of ordinary skill in the art may understand that all or some of the steps in each of the foregoing method of the embodiments may be implemented by a program instructing a processor. The foregoing program may be stored in a computer readable storage medium. The storage medium may be a non-transitory (non-transitory) medium, such as a random-access memory, a read-only memory, a flash memory, a hard disk, a solid state drive, a magnetic tape (magnetic tape), a floppy disk (floppy disk), optical disc (optical disc), or any combination thereof.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method implemented by a terminal, comprising:
   obtaining an uplink control information (UCI) in a first format, wherein the UCI in the first format comprises measurement result information of a beam group, wherein the beam group comprises a first beam and a second beam, wherein the measurement result information of the beam group in the first format of the UCI comprises a first measurement result of the first beam and further comprises an offset of a second measurement result of the second beam relative to the first measurement result, and wherein the first measurement result in the first format of the UCI is a reference measurement result; and
   sending the UCI in the first format including both the first measurement result of the first beam and the offset of the second measurement result of the second beam to a radio access network device.

2. The data transmission method of claim 1, wherein the first measurement result comprises a maximum measurement value of measurement results of beams in the beam group.

3. The data transmission method of claim 1, wherein before obtaining the UCI, the data transmission method further comprises receiving indication information from the radio access network device, and wherein the indication information instructs the terminal to set either the first beam or the first measurement result as a reference for a UCI reporting.

4. The data transmission method of claim 3, wherein the indication information further comprises:
   a first method for determining the first beam when the indication information instructs the terminal to set the first beam as the reference; and
   a second method for determining the first measurement result when the indication information instructs the terminal to set the first measurement result as the reference.

5. The data transmission method of claim 3, wherein the indication information further indicates a reference signal for measurement, and wherein the reference signal comprises at least one of a synchronization signal, a synchronization signal resource identifier, a channel state information reference signal (CSI-RS), or a CSI-RS resource identifier.

6. The data transmission method of claim 3, wherein the indication information further instructs the terminal whether to report the UCI based on beam grouping.

7. The data transmission method of claim 6, further comprising:
   determining the beam group by grouping beams when the indication information instructs the terminal to report the UCI based on beam grouping.

8. A terminal comprising:
   a memory configured to store instructions; and
   a processor coupled to the memory and configured to execute the instructions to cause the terminal to:
      obtain an uplink control information (UCI) in a first format, wherein the UCI in the first format comprises measurement result information of a beam group, wherein the beam group comprises a first beam and a second beam, wherein the measurement result information in the first format of the UCI of the beam group comprises a first measurement result of the first beam and further comprises an offset of a second measurement result of the second beam relative to the first measurement result, and wherein the first measurement result comprises a reference measurement result; and
      send the UCI in the first format including both the first measurement result of the first beam and the offset of the second measurement result of the second beam to a radio access network device.

9. The terminal of claim 8, wherein the first measurement result comprises a maximum measurement value of measurement results of beams in the beam group.

10. The terminal of claim 8, wherein the processor is further configured to execute the instructions to cause the terminal to receive indication information from the radio access network device before obtaining the UCI, and wherein the indication information instructs the terminal to either set the first beam or the first measurement result as a reference for a UCI reporting.

11. The terminal of claim 10, wherein the indication information further comprises:
a first method for determining the first beam when the indication information instructs the terminal to set the first beam as the reference; and
a second method for determining the first measurement result when the indication information instructs the terminal to set the first measurement result as the reference.

12. The terminal of claim 10, wherein the indication information further indicates a reference signal for measurement, and wherein the reference signal comprises at least one of a synchronization signal, a synchronization signal resource identifier, a channel state information reference signal (CSI-RS), or a CSI-RS resource identifier.

13. The terminal of claim 10, wherein the indication information further instructs the terminal whether to report the UCI based on beam grouping.

14. The terminal of claim 13, wherein the processor is further configured to execute the instructions to cause the terminal to determine the beam group by grouping beams when the indication information instructs the terminal to report the UCI based on beam grouping.

15. A computer program product comprising computer-executable instructions for storage on a non-transitory computer-readable medium that, when executed by a processor, cause an electronic device to:
obtain an uplink control information (UCI) in a first format, wherein the UCI in the first format comprises measurement result information of a beam group comprising a first beam and a second beam, wherein the measurement result information of the beam group in the first format of the UCI comprises a first measurement result of the first beam and further comprises an offset of a second measurement result of the second beam relative to the first measurement result, and wherein the first measurement result comprises a reference measurement result; and
send the UCI in the first format including both the first measurement result of the first beam and the offset of the second measurement result of the second beam to a radio access network device.

16. The computer program product of claim 15, wherein the first measurement result comprises a maximum measurement value of measurement results of beams in the beam group.

17. The computer program product of claim 15, wherein the computer-executable instructions further cause the electronic device to receive indication information from the radio access network device before obtaining the UCI, and wherein the indication information instructs the electronic device to either set the first beam or the first measurement result as a reference for a UCI reporting.

18. The computer program product of claim 17, wherein—the indication information further comprises:
a first method for determining the first beam when the indication information instructs the electronic device to set the first beam as the reference; and
a second method for determining the first measurement result when the indication information instructs the electronic device to set the first measurement result as the reference.

19. The computer program product of claim 17, wherein the indication information further indicates a reference signal for measurement, and wherein the reference signal comprises at least one of a synchronization signal, a synchronization signal resource identifier, a channel state information reference signal (CSI-RS), or a CSI-RS resource identifier.

20. The computer program product of claim 17, wherein the indication information further instructs the electronic device whether to report the UCI based on beam grouping, and wherein the computer-executable instructions further cause the electronic device to determine the beam group by grouping beams.

* * * * *